(12) United States Patent
Delbue

(10) Patent No.: US 10,504,383 B2
(45) Date of Patent: Dec. 10, 2019

(54) COMPUTER-IMPLEMENTED ENVIRONMENTS AND INTERFACES FOR EDUCATIONAL GAMES

(71) Applicant: Ana Maria Delbue, Buenos Aires (AR)

(72) Inventor: Ana Maria Delbue, Buenos Aires (AR)

(*) Notice: Subject to any disclaimer, the term of this patent is extended or adjusted under 35 U.S.C. 154(b) by 593 days.

(21) Appl. No.: 15/008,146

(22) Filed: Jan. 27, 2016

(65) Prior Publication Data

US 2016/0314706 A1    Oct. 27, 2016

Related U.S. Application Data

(63) Continuation of application No. 12/455,070, filed on May 27, 2009, now abandoned.

(60) Provisional application No. 61/056,300, filed on May 27, 2008, provisional application No. 61/148,743, filed on Jan. 30, 2009.

(51) Int. Cl.
| | |
|---|---|
| G09B 19/00 | (2006.01) |
| G09B 7/04 | (2006.01) |
| A63F 13/25 | (2014.01) |
| A63F 1/00 | (2006.01) |
| G09B 7/02 | (2006.01) |
| G09B 15/00 | (2006.01) |
| G09B 19/22 | (2006.01) |

(52) U.S. Cl.
CPC ............ *G09B 19/0046* (2013.01); *A63F 1/00* (2013.01); *A63F 13/25* (2014.09); *G09B 7/02* (2013.01); *G09B 7/04* (2013.01); *G09B 15/00* (2013.01); *G09B 19/22* (2013.01)

(58) Field of Classification Search
CPC ... G07F 17/3293; G09B 19/0046; G09B 7/04; G09B 7/02; G09B 15/00; G09B 19/22; A63F 13/25; A63F 7/02

USPC ........................................................ 434/350
See application file for complete search history.

(56) References Cited

U.S. PATENT DOCUMENTS

| | | |
|---|---|---|
| 631,766 A | 8/1899 | Holman, Jr. |
| 1,617,773 A | 2/1927 | Sergel et al. |
| 5,827,070 A | 10/1998 | Kershaw et al. |
| 6,454,265 B1 | 9/2002 | Elliott et al. |

(Continued)

OTHER PUBLICATIONS

"Go Fish, Authors, Happy Families, Quartet," downloaded from http://www.pagat.com/quartet/gofish.html, 4 pp. (document marked as being last updated on Mar. 8, 2007).

(Continued)

*Primary Examiner* — Jack Yip
(74) *Attorney, Agent, or Firm* — Klarquist Sparkman, LLP

(57) ABSTRACT

Disclosed below are representative embodiments of methods, apparatus, and systems for providing computer-implemented educational games. For example, one disclosed embodiment comprises a system for providing a computer-based educational game environment comprising a processor, memory, and storage storing computer-executable instructions that, when executed by the processor, allow a player at a first remote computer to play one or more educational games at the first remote computer and allow a thematic specialist at a second remote computer to modify content or rules of the one or more educational games. In certain embodiments, at least one of the educational games is a game that requires a player to classify patterns into groups of like patterns.

14 Claims, 26 Drawing Sheets
(23 of 26 Drawing Sheet(s) Filed in Color)

(56) References Cited

U.S. PATENT DOCUMENTS

| | | | |
|---|---|---|---|
| 6,895,214 B2 | 5/2005 | Murphy | |
| 6,910,893 B2 | 6/2005 | Dillhoff | |
| 7,462,104 B2* | 12/2008 | Di Cesare | A63F 13/005 |
| | | | 463/40 |
| 2002/0103830 A1 | 8/2002 | Hamaide et al. | |
| 2002/0178212 A1 | 11/2002 | Sirhall | |
| 2004/0005926 A1* | 1/2004 | LeFroy | G07F 17/32 |
| | | | 463/42 |
| 2005/0023755 A1* | 2/2005 | Leshem | A63F 3/0478 |
| | | | 273/242 |
| 2005/0113170 A1* | 5/2005 | McHugh | G09B 7/02 |
| | | | 463/40 |
| 2008/0176619 A1* | 7/2008 | Kelly | A63F 3/081 |
| | | | 463/16 |
| 2009/0082095 A1* | 3/2009 | Walker | G07F 17/32 |
| | | | 463/25 |
| 2009/0197236 A1* | 8/2009 | Phillips, II | G09B 7/00 |
| | | | 434/350 |
| 2009/0264173 A1* | 10/2009 | Zois | A61B 5/165 |
| | | | 463/9 |

OTHER PUBLICATIONS

Lehdonvirta, "Virtual item sales as a revenue model: identifying attributes that drive purchase decisions," *Electron. Commer. Res.*, vol. 9, pp. 97-113 (Mar. 2009).

\* cited by examiner

COMPUTER-IMPLEMENTED ENVIRONMENTS AND INTERFACES FOR EDUCATIONAL GAMES

CROSS REFERENCE TO RELATED APPLICATIONS

This application is a continuation of U.S. patent application Ser. No. 12/455,070, entitled "Computer-Implemented Environments and Interfaces for Educational Games," and filed on May 27, 2009, which claims the benefit of U.S. Provisional Application No. 61/056,300, entitled "Computer-Implemented Environments and Interfaces for Educational Games" and filed on May 27, 2008, and U.S. Provisional Application No. 61/148,743, entitled "Computer-Implemented Environments and Interfaces for Educational Games" and filed on Jan. 30, 2009, all of which are hereby incorporated herein by reference.

FIELD

This application relates to computer-implemented systems, methods, and apparatus for providing educational games.

SUMMARY

Disclosed below are representative embodiments of methods, apparatus, and systems for providing computer-implemented educational services. The disclosed methods, apparatus, and systems should not be construed as limiting in any way. Instead, the present disclosure is directed toward all novel and nonobvious features and aspects of the various disclosed embodiments, alone and in various combinations and subcombinations with one another. The methods, apparatus, and systems are not limited to any specific aspect or feature or combination thereof, nor do the disclosed embodiments require that any one or more specific advantages be present or problems be solved.

One disclosed embodiment comprises a system for providing a computer-based educational game environment, comprising a processor, memory, and storage storing computer-executable instructions that, when executed by the processor, allow a player at a first remote computer to play one or more educational games at the first remote computer and allow a thematic specialist at a second remote computer to modify content or rules of the one or more educational games. In certain embodiments, at least one of the educational games is a game that requires a player to classify patterns into groups of like patterns. In some embodiments, a first one of the educational games is a multi-player game and a second one of the educational games is a single-player game. In certain embodiments, one or more of the educational games display to the player a plurality of art works, at least some of the art works having a common criteria, and the one or more educational games require the player to identify the art works having the common criteria in order to earn game points. In certain implementations, the game points earned by the player can be stored and later redeemed by the player for a uniquely identifiable digital representation of an art work. Further, in some implementations, the game points can be redeemed for one or more prizes directly from a server, via exchange with other players, or at a scheduled time in an auction with other players. In some embodiments, the art works are one of painted works, musical works, sculpted works, literary works, or architectural works. In certain embodiments, the common criteria is one of an artist's name, time period, country of origin, artistic style, or art work type. In some embodiments, at least one of the educational games is a game that requires a player to identify game cards that are related to each other according to a common criteria, and wherein the game cards comprise audio data for musical works or literary works. In certain embodiments, at least one of the educational games is a game that requires a player to identify game cards that are related to each other according to a common criteria, and wherein the game cards comprise visual representations of painted works, sculpted works, literary works, architectural works, historical events or persons, geographical items, or sports events or persons. In some embodiments, an educational quiz can be created by the thematic specialist and displayed to the player at the first remote computer during, before, or after play of the one or more educational games. For instance, the thematic specialist can schedule the display of the educational quiz and review the player's performance on the educational quiz. In certain embodiments, the thematic specialist, the player, and one or more other players can send and receive video, text, or audio messages to one another.

Another disclosed embodiment comprises one or more tangible computer-readable storage media storing computer-executable instructions for causing a computer to perform a method. In this embodiment, the method comprises causing a game interface to appear on a computer display of a first player, the game interface displaying game cards currently held by the first player as part of an educational game and allowing the first player to input a request for a game card from one or more other players, wherein the game cards comprise visual or audio representations of artistic works selected from a set of game cards, the set of game cards being arranged into families of two or more game cards, each family of game cards having a common criterion. In certain embodiments, the method further comprises storing the cards remaining in the set of game cards, and adding one of the remaining cards to the game cards currently held by the first player if none of the other players have the requested game card or if the first player chooses to pass rather than input the request for the game card from the one or more other players. In some embodiments, the method further comprises storing respective scores for the first player and the one or more other players. The score for the first player can be increased, for example, if the first player has all game cards in a respective one of the families and if the first player chooses to claim the respective one of the families. In certain embodiments, the method further comprises indicating to the first player and the one or more other players that a game has ended when all of the families have been claimed. The method can further comprise, for example, displaying the name of the player who claimed the most families and therefore won the game, and displaying scores for the first player and the one or more other players. A game play database can be updated with the scores for the first player and the one or more other players. In certain embodiments, the common criterion for a respective family is one of an artist's name of the artistic works in the respective family, time period of the artistic works in the respective family, country of origin of the artistic works in the respective family, artistic style of the artistic works in the respective family, or type of art work in the respective family. In some embodiments, the families are one of painted works, musical works, sculpted works, literary works, or architectural works. In certain embodiments, the game interface further displays one or more of the following: names and scores of the one or more other players, the number of cards left in the set of game cards, or the name of the player whose turn it is. In some embodiments, the method further comprises causing a game interface to appear on a computer display of one of the other players holding the requested card, and updating the game cards displayed to the one of the other players in response to the request from the first player to show that the game card has been requested and transferred to the first player. In certain embodiments, the method further comprises causing the first player to lose a turn and obtain a card from the set of game cards if none of the one or more other players holds the requested card. In some embodiments, the method further comprises allowing the first player to claim a respective family of game cards if the first player holds all game cards in the respective family, updating a score of the first player in response to the first player claiming the respective family, and indicating to the one or more other players that the respective family has been claimed, the game cards in the respective family, and the updated score. In certain embodiments, the game interface displayed to the first player and the one or more other players comprises a chat pane that allows players to send text, audio or video messages to one another. In some embodiments, the game interface comprises multiple panes or window tabs (hereinafter "panes"), a first pane of the multiple panes displaying the game cards currently held by the first player, and a second pane of the multiple panes displaying the list of families from the set of game cards. The game interface can further comprise a third pane displaying all the game cards of a family selected from the list of families of the second pane. Furthermore, the game interface can associate each of the game cards of the family with a color, thereby indicating a current status of the game cards of the family. In certain implementations, the second pane is configured to alternatively display additional game card information about a game card selected from the third pane. For instance, the additional game card information can include an enlarged image of the art work associated with the game card selected from the third pane or a portrait of the author or composer of the art work associated with the game card selected from the third pane. In some embodiments, the game interface further displays one or more quiz questions to the first player, the quiz questions being related to the artistic works from the set of game cards. In certain embodiments, the method further comprises causing an interface to appear to a thematic specialist that allows the thematic specialist to upload game cards and game data and to select the criterion for the families of the two or more game cards.

Another disclosed embodiment also comprises one or more tangible computer-readable storage media storing computer-executable instructions for causing a computer to perform a method. In this embodiment, the method comprising causing a game interface to appear on a computer display of a player, the game interface displaying at least some of a set of game cards, the set of game cards being arranged into families of two or more game cards, each family having a common criterion, the game interface further allowing the player to select one of the displayed game cards for inclusion in a hand of game cards displayed to the player until the hand of game cards is complete, the hand of game cards being complete when the player selects all game cards that satisfy the common criteria for a selected one or more of the families. In certain embodiments, the common criterion for a respective family is one of an artist's name of the artistic works in the respective family, time period of the artistic works in the respective family, country of origin of the artistic works in the respective family, artistic style of the artistic works in the respective family, or type of art work of the artistic works in the respective family. In some embodiments, the artistic works are one of painted works, musical works, sculpted works, literary works, or architectural works. In certain embodiments, the selected one or more of the families are selected randomly by the computer. In such embodiments, the number of families can be selected randomly or by the player. In other embodiments, the selected one or more of the families are selected by the player. In such embodiments, the number of families can also be selected randomly or by the player. In certain embodiments, the game interface further displays to the player an indication of a number of incorrect selections the player can make while attempting to complete the hand. In some embodiments, the method further comprises calculating a score for the player when the hand is complete, and displaying the score to the player, wherein the score is based at least in part on one or more of the number of incorrect selections made by the player, the number of times the player has selected the same family, and the time the player spent in completing the hand.

Any of the disclosed methods can be implemented as computer-executable instructions stored on one or more computer-readable media (e.g., tangible computer-readable media, such as one or more optical media discs, volatile memory components (such as DRAM or SRAM), or non-volatile memory components (such as hard drives)) and executed on a computer (e.g., any commercially available computer). For example, any of the computer-executable instructions for implementing the disclosed game play interfaces as well as any data used by the game play interfaces during play can be stored on one or more computer-readable media (e.g., tangible computer-readable media). The computer-executable instructions can be part of for example, a dedicated software application or a software application that is accessed or downloaded via a web browser. More specifically, such software can be executed on a single computer (e.g., any suitable commercially available computer) or in a network environment (e.g., via the Internet, a wide-area network, a local-area network, a client-server network, or other such network).

The foregoing and other objects, features, and advantages of the invention will become more apparent from the following detailed description, which proceeds with reference to the accompanying figures.

BRIEF DESCRIPTION OF THE DRAWINGS

The patent or application file contains at least one drawing executed in color. Copies of this patent or patent application publication with color drawings will be provided by the Office upon request and payment of the necessary fee.

DETAILED DESCRIPTION

I. General Considerations

Figure 1:
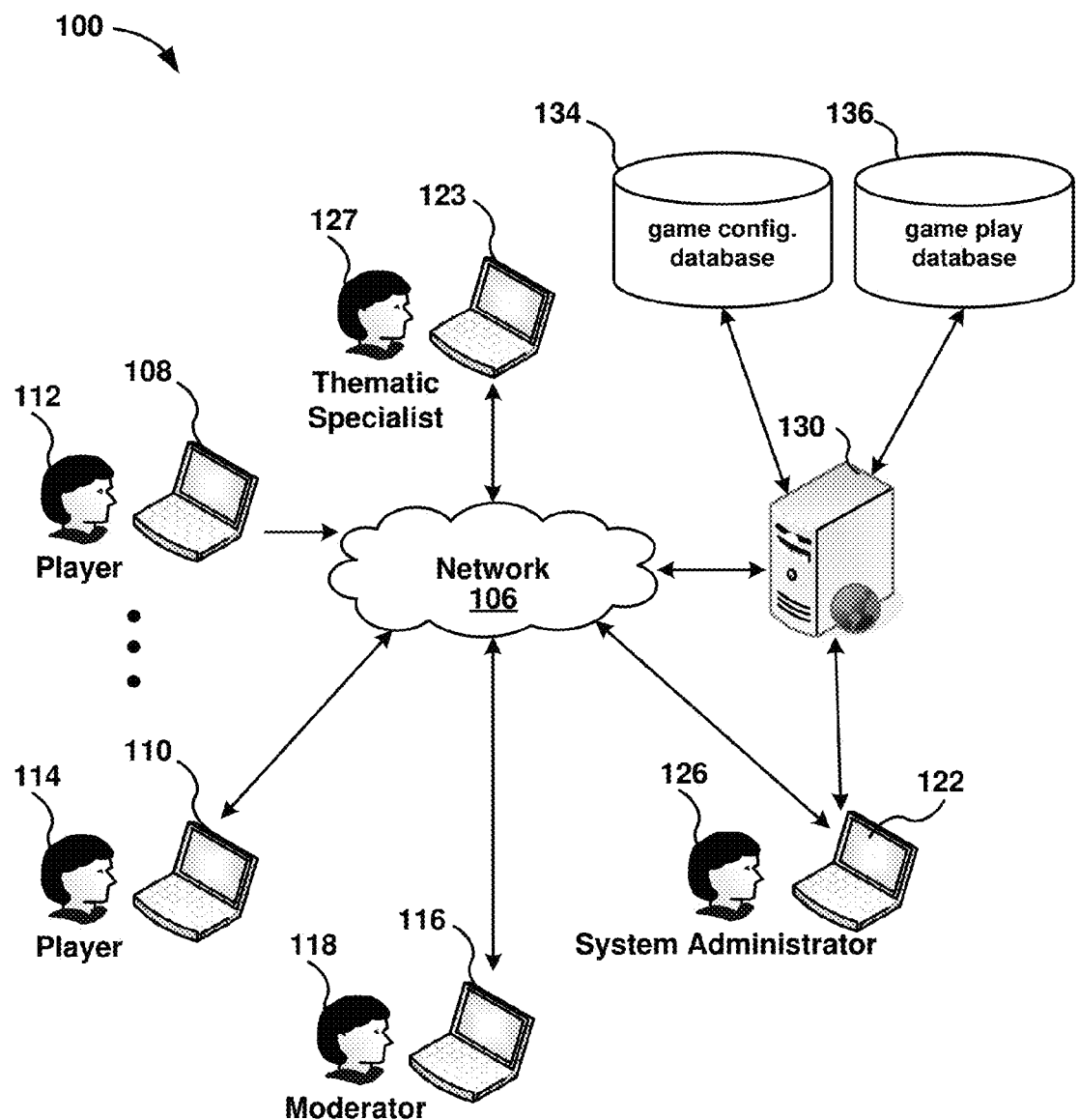
FIG. 1 is a schematic block diagram of an exemplary networked game system.

Disclosed below are representative embodiments of methods, apparatus, and systems for providing computer-implemented educational services. For example, some embodiments involve computer-implemented games for teaching children about subjects that they normally shun as "boring," such as painting, music, or architecture. The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods. Additionally, the description sometimes uses terms like "determine" and "generate" to describe the disclosed methods. These terms are high-level abstractions of the actual operations that are performed. The actual operations that correspond to these terms may vary depending on the particular implementation and are readily discernible by one of ordinary skill in the art.

Any of the disclosed methods can be implemented as computer-executable instructions stored on one or more computer-readable media (e.g., tangible computer-readable media, such as one or more optical media discs, volatile memory components (such as DRAM or SRAM), or non-volatile memory components (such as hard drives)) and executed on a computer (e.g., any commercially available computer). For example, any of the computer-executable instructions for implementing the disclosed game play interfaces as well as any data used by the game play interfaces during play can be stored on one or more computer-readable media (e.g., tangible computer-readable media). The computer-executable instructions can be part of, for example, a dedicated software application or a software application that is accessed or downloaded via a web browser. More specifically, such software can be executed on a single computer (e.g., any suitable commercially available computer) or in a network environment (e.g., via the Internet, a wide-area network, a local-area network, a client-server network, or other such network).

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Well-known details of suitable computers and hardware are well known and need not be set forth in detail in this disclosure.

Furthermore, any of the software embodiments (comprising, for example, computer-executable instructions for causing a computer to perform any of the disclosed methods) can be transmitted, received, or accessed through a suitable communication means. Similarly, any of the computer-executable instructions for implementing the game play interfaces or data used by the game play interfaces during play can be transmitted, received, or accessed through a suitable communication means. Such suitable communication means include, for example, the Internet, the World Wide Web, an intranet, software applications, cable (including fiber optic cable), magnetic communications, electro-magnetic communications (including RF, microwave, and infrared communications), electronic communications, or other such communication means.

Certain embodiments of the disclosed technology provide an interactive learning environment for students. Interactive learning techniques, facilitated with computer and networking technology, have several possible advantages over passive learning techniques, where students learn merely by viewing or listening to recorded lectures, audio, or video presentations. For example, interactive learning techniques are non-static and allow individual students to select or influence the specific material to be viewed, giving them an educational advantage over passive learning techniques. Another possible advantage of interactive learning techniques is that such techniques allow for feedback to the student from the computer hardware, teachers, and other students interacting with the interactive learning system. Another possible advantage of interactive learning is that student interest is heightened by collaborating or competing with other students. Yet another possible advantage of interactive learning is that by presenting the educational material in a game or interactive format, the student experience is less likely to "bore" or lose the interest of the student. Yet another possible advantage of the disclosed learning environment is that it improves a player's ability to classify complex patterns into groups of like (or similar) patterns (e.g., by identifying artists by patterns in their work) by exposure to one pattern and comparison to others in order to induce learning by pattern recognition. This same capability is used by humans to recognize faces, familiar body movements, places, styles, eras, types of trees and flowers, age, and the like. This process of learning is very different from a process that teaches the elements of a pattern that belong to a group, or a game where you look for specific elements to identify a member of a group. It is also very different from teaching someone to paint or play music in a particular style. Any one or more of these advantages can be realized in embodiments of the disclosed technology.

Embodiments of the educational game system disclosed herein typically involve four classes of persons: players, moderators, thematic specialists, and system administrators. The typical age for a player is thought to be between ages 8 and 13, but any player or moderator with sufficient expertise to use a computing client can use the system. Players are typically school students and usually spend most of their time playing the games available through the educational game system or using the quiz and chat features available on the system. Moderators are typically teachers, librarians, family members, or artists and usually spend most of their time monitoring game play, or player membership. Thematic Specialists are typically experts in a specific subject matter (e.g., impressionist art, jazz music, etc.) and usually spend most of their time studying these subjects and will use the system to develop new games and game materials. System administrators are responsible for maintaining the system as well as occasionally developing or installing games and software tools on the system. It should be understood that although these classes of persons are separately delineated, a single person can act as two or more of the classes. For example, a single individual can be both a moderator and thematic specialist.

Several embodiments of the disclosed technology involve networked games, which can be implemented using the Internet or other computer network. The disclosed technology may be implemented, for example, on a general-purpose personal computer utilizing commercially available browser software. Other embodiments may be implemented on a special-purpose computing platform (e.g., a dedicated stand-alone hardware, a handheld embedded system, or the like). One skilled in the art will recognize that the networking technology sufficient to implement the disclosed technology is not limited to the Internet, but may comprise a wired or fiber optic intranet, a wireless network, network telephony, or other computer network technology. While several of the embodiments disclosed herein are turn-based games, it should be understood that alternative embodiments may also include non-turn-based games (e.g., massively multiplayer online games (MMOGs)).

As with many networked games, the player network in certain embodiments of the disclosed technology is implemented using a client-server topology. For example, in one embodiment, each player has access to a computer client, which the player interacts with using an electronic keyboard, mouse, video, audio, or other means. One or more game servers are accessed by the player computer clients using the computer network. In particular implementations, the game server is capable of performing any one or more of the following community and game functions: creating player accounts, verifying player access to game instances, executing certain functions of game instances (such as dealing cards), allowing moderator control of game instances or player accounts active on the server, and providing means for communication, such as text, voice, or video messaging services. Other server functions that can be performed by the game server include configuring game rules and game data, as well as configuring pop up quizzes and scheduled quizzes.

Figure 7:
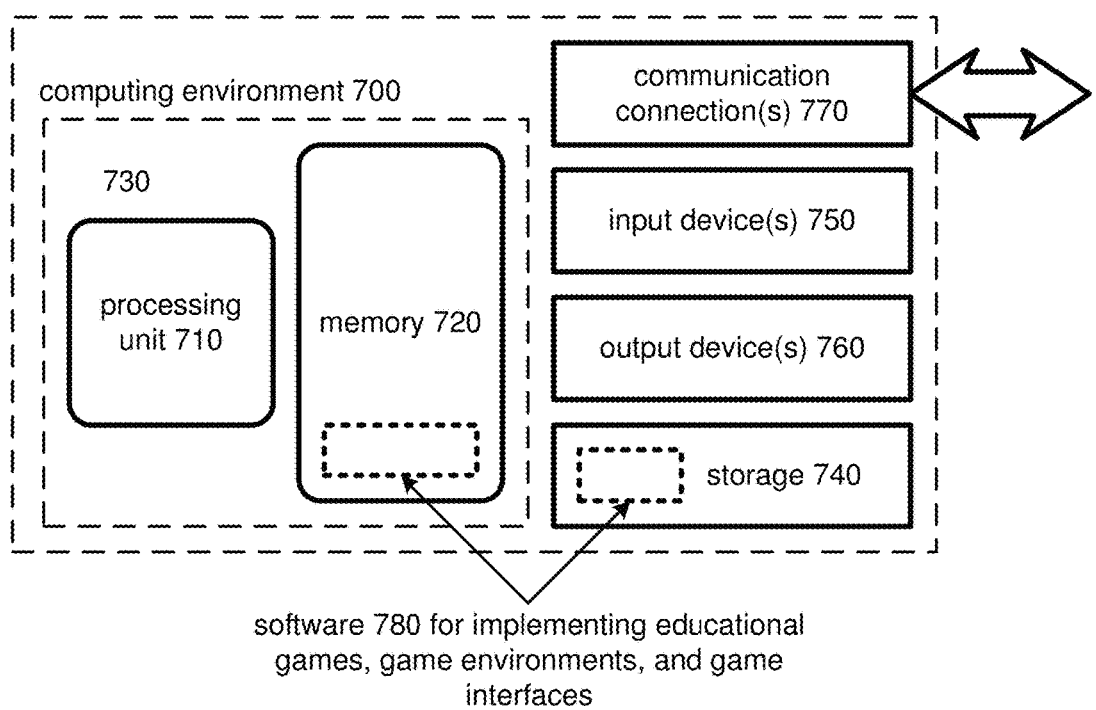
FIG. 7 is a schematic block diagram of a computing environment as can be used to implement embodiments of the disclosed technology either alone or in connection with the networked game system of FIG. 1.

II. Exemplary Computing Environments and Game Client/Game Server Network Architectures FIG. 7 illustrates a generalized example of a suitable computing environment 700 in which several of the described embodiments can be implemented. The computing environment 700 is not intended to suggest any limitation as to scope of use or functionality, as the techniques and tools may be implemented in diverse general-purpose or special-purpose computing environments.

With reference to FIG. 7, the computing environment 700 includes at least one processing unit 710 and memory 720. In FIG. 7, this most basic configuration 730 is included within a dashed line. The processing unit 710 executes computer-executable instructions and may be a real or a virtual processor. In a multi-processing system, multiple processing units execute computer-executable instructions to increase processing power. The memory 720 may be volatile memory (e.g., registers, cache, RAM), non-volatile memory (e.g., ROM, EEPROM, flash memory, etc.), or some combination of the two. The memory 720 stores software 780 implementing one or more of the described educational games, environments, or interfaces.

The computing environment may have additional features. For example, the computing environment 700 includes storage 740, one or more input devices 750, one or more output devices 760, and one or more communication connections 770. An interconnection mechanism (not shown) such as a bus, controller, or network interconnects the components of the computing environment 700. Typically, operating system software (not shown) provides an operating environment for other software executing in the computing environment 700, and coordinates activities of the components of the computing environment 700.

The storage 740 may be removable or non-removable, and includes magnetic disks, magnetic tapes or cassettes, CD-ROMs, DVDs, or any other tangible storage medium which can be used to store information and which can be accessed within the computing environment 700. The storage 740 can store instructions for the software 780 implementing any of the described educational games, systems, or environments.

The input device(s) 750 can be a touch input device such as a keyboard, mouse, pen, or trackball, a voice input device, a scanning device, or another device that provides input to the computing environment 700. For audio or video encoding, the input device(s) 750 can be a sound card, video card, TV tuner card, or similar device that accepts audio or video input in analog or digital form, or a CD-ROM or CD-RW that reads audio or video samples into the computing environment 700. The output device(s) 760 can be a display, printer, speaker, CD-writer, or another device that provides output from the computing environment 700.

The communication connection(s) 770 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

The various game methods, environments, and interfaces disclosed herein can be described in the general context of computer-readable media. Computer-readable media are any available media that can be accessed within or by a computing environment. By way of example, and not limitation, with the computing environment 700, computer-readable media include tangible computer-readable storage media such as memory 720 and storage 740.

The various game methods, environments, and interfaces disclosed herein can also be described in the general context of computer-executable instructions, such as those included in program modules, being executed in a computing environment on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing environment.

An example of a possible network topology for implementing embodiments of the disclosed technology (e.g., for implementing multiplayer embodiments) is depicted in FIG. 1. Computing clients 108, 110, 116, 122, 123 can be, for example, personal computers running browser software such as Microsoft Internet Explorer, Safari, or Mozilla Firefox to access the game server. The computing clients 108, 110, 116 122 can have computer architectures as shown in FIG. 7 and discussed above. The computing clients 108, 110, 116, 122, 123 are not limited to traditional personal computer platforms, such as Windows XP or Apple Mac OS X, but can be any device configured to connect to a digital network (for instance, a networked handheld device (e.g., a cellular phone, an iPhone, or PDA) or a home game console (e.g., Sony Playstation 3 or Microsoft Xbox). In some implementations, additional software to execute the client side interface is used (e.g., Sun Microsystems Java, Adobe Flash, Microsoft Ajax, PHP, Javascript, or the like).

In the illustrated embodiment, the players use their computing clients 108, 110 to connect to one or more game servers 130. The game server 130 is accessed over a network 106, which can be implemented as a Local Area Network (LAN) using wired networking (e.g., the Ethernet IEEE standard 802.3 or other appropriate standard) or wireless networking (e.g., one of the IEEE standards 802.11a, 802.11b, 802.11g, or 802.11n or other appropriate standard). Alternatively, and most likely, at least part of the network 106 utilized to connect to the game server 130 can be the Internet, or a similar public network.

In particular embodiments, the game server 130 is configured to serve game data, program code, text, audio, video, and/or graphics, over a network protocol (e.g., an Internet protocol running the Hyper Text Transfer Protocol (http) or secure Hyper Text Transfer Protocol (https)). The game server 130 can be implemented utilizing commercially available software applications or combinations therefor (e.g., Apache HTTP Server, Smart Fox Server, Smart Fox Server Pro, Unity, as well as specialized code written in web programming languages such as Adobe Flash Actionscript 2.0, Adobe Flash Actionscript 3.0, Perl, or PHP, and commercially available or open-code database software, such as mySQL, Oracle, or H2). It will be readily apparent to one skilled in the art of web server configuration how to configure and enable games disclosed herein using such software. The game server 130 can have also have a computer architecture as described in FIG. 7 and discussed above.

In certain embodiments, the game server 130 is configured to manage player logon events, implement game play, implement community features, and allow selected thematic specialists, game moderators and administrators privileged access to the server. Privileged access can be granted, for instance, in order to allow game moderators and thematic specialists to perform one or more of the following management actions: configuration and moderation of game play; configuration and moderation of communities; management of player accounts and access; creation and configuration of new game rules; and importation, creation, and configuration of new game data with previously created games. In some implementations, the game server 130 allows for the configuration of parameters that enable the creation or modification of the games provided by the game server 130. The game server 130 can also provide for the download of at least some of the software necessary to run the game, which can be downloaded to the computing client in source code, byte code, or object code form, or browser-executable code as well as sounds and images in appropriate formats (e.g., PNG, JPEG, MP3, GIF, etc.).

In particular embodiments, an individual player (e.g., player 112) uses computing client 108 to initiate contact with the game server 130 over a network 106. After the software has loaded onto an individual player's computing client 108, that player 112 is prompted to logon to an existing account, or to create a new one. Once the player 112 has logged in, and according to one exemplary embodiment, she has access to a variety of different options. For example, the player can be presented with the options of playing a single player game or of participating in a multi-player game. In the latter case, the player can be presented with the further option of creating a new instance of a game, joining an existing instance of a game, or visiting the "lobby" in order to chat or find a player or players to join a new or existing game. The configurations of the games can be created or modified by individual players 112, 114, by a moderator 118 utilizing a computing client 116, by a thematic specialist 127 utilizing a computing client 123, by a system administrator 126 via a computing client 122, or via a direct connection to the game server 130.

The game server 130 can store game specific information in one or more databases. The game databases can be separated, for example, into two databases: a game configuration database 134 and a game play database 136. This separation allows for easier system management by concentrating information regarding game play, rules, artist names, art works titles, art work locations, images, graphics, audio files, or video files, into the game configuration database 134, and storing actual game data, such as player registration names and passwords, access privileges (e.g., player, system administrator, moderator, or thematic specialist), sessions, and scores and prizes in the game play data database 136. The game configuration database can include screen literals, such as button titles, data titles, error messages, and other display data. An additional benefit of keeping the data distinct is in facilitating translation of games from one language to another. For example, in certain implementations, only the prompt data, and the artwork titles, stored in the game configuration database, will need to be updated to translate the game from one language to another.

III. Exemplary Player Interfaces Used During Game Play

The games that are provided by the game server 130 can have a variety of rules and game play features. In desirable embodiments, however, the games provide an interactive educational experience to the players.

In one embodiment (referred to herein as the "first exemplary multiplayer game") of the disclosed technology, the game that is provided by the game server 130 is played in the following manner. A selection of game "cards" is created by the system administrator, a thematic specialist, or a moderator and dealt to the players. Each game card is associated with a portion of multimedia (e.g., a photograph, symbol, or audio recording). Each game card is also associated with a "set" or "family," which is a set of two or more cards with a matching relationship. Players endeavor to collect all cards in a family, by requesting them from other players or by receiving them from the deck, thereby forming a completed set. Points can be awarded for each completed set. Play can continue until no cards are in any of the player's hands. At that point, the player with the most completed sets can be designated as the winner of the game.

In one particular implementation, the game cards have digitized images of famous old master paintings. The relationship between the cards of a family can be based on a common attribute of the cards, such as the painter, time period, country of origin, artistic style, type of artwork and so forth. One family of cards might include four paintings by Leonardo DaVinci (e.g., *La Belle Ferroniere, Virgin of the Rocks, Mona Lisa*, and *The Virgin and Child with St. Anne*), while another family might include four paintings by Pieter Bruegel (e.g., *Peasant Wedding, The Tower of Babel, The Harvesters*, and *The Hunters in the Snow* (*Winter*)). Alternatively, the families for these same cards can be grouped by time period (e.g., fifteenth and sixteenth century paintings) country of origin (e.g., Italy and the Netherlands) or type of art work (e.g., portrait, landscape, still life, self portrait, and so on). The selection of paintings or family definitions can be defined by a thematic specialist in order to vary the level of difficulty of the game or to emphasize certain educational aspects of the subject matter (e.g., history vs. artistic style). In certain implementations, however, the selection of paintings or family definitions can be defined by any of the system administrator, moderator, player, or thematic specialist.

It should be understood that the subject matter that is incorporated into the games is not limited to paintings, and may include nearly any appropriate subject, for example, but not limited to: painting, music, literature, history, geography, sports, and other visual, musical or physical arts (including architecture, ceramics, glass art, land art, metalworking, mosaic, paper art, sculpture, textile art, and woodworking) as well as sports and other popular categories susceptible of being grouped into families. Subject matter may be as detailed or as general as the educational objectives require. Examples of specific subject matter (either by type, historical period, country of origin, or other criteria) include: (1) for painting: classical works, gothic works, renaissance works, baroque works, impressionist works, modern works, Japanese works, Chinese works, portraits, self portraits, landscapes, marina works, still lifes; (2) for music: classical works, operatic works, $20^{th}$ Century classical works, jazz works, rock works, Latino works, Afro-American works, symphonic works, chamber music, ballets; (3) for geography: countries or cities (e.g., grouped by continent), views (e.g., grouped by National Park), rivers (e.g., grouped by country or state), or mountains (e.g., grouped by country or state); (4) for history: events (e.g., grouped by time period or by geographical location), public figures (e.g., grouped by time period or by country), battles, presidents, kings, heroes; (5) for sports: events (e.g., grouped by time period or by geographical location), sports figures or teams (e.g., soccer world cup teams, olympic champions, baseball champions), and (6) for literature: novels, plays, poetry, essays, biographies, autobiographies, books grouped by author, books grouped by historical period, authors grouped by original language.

In one particular implementation in which the cards include images of famous old master classical paintings, the specific rules of the card game to be played on the educational game system are as follows. The game is played with a fixed number of cards (e.g., 60 or other number) grouped into a fixed number of sets or families (e.g., 15 or other number). In this implementation, each set or family has a fixed number of cards (e.g., 4 or other number) and represents a single artist. Any number of players can play, but in a desirable embodiment, between 2 and 4 players can play. The goal of the game is to claim more sets than other players.

After signing on, players select to play the game and wait for the game to start. A game can begin automatically once all players have joined the game. If no game is open, for example, any player can start one, state the desired number of players, and wait for others to join it. A password can be used to ensure that a group of friends can restrict a game to themselves.

At the beginning of the game, each player is dealt a preset or user-defined number of cards (e.g., 11 or other number). The remaining cards stay in the deck. The first turn can be randomly selected, or begin with a particular player (e.g., the player that started the game). Information about whose turn it is to play can be shown in a game window (e.g., in a status pane, described in more detail below).

The first player asks for a card (e.g., an art work) from any of the other players. For example, if her hand contains *Primavera* and *The Birth of Venus* by Boticelli, then he/she may want to ask for *Cestello Annunciation* from any other player. If the other player has the requested card, the server automatically causes the other player to give it to the requestor, who then has another turn at requesting a card from the same player or from another player. If the requestor completes a set or family of four cards (four art works from the same artist), she can claim the artist and continue playing. A player can only claim an artist during her turn.

If the other player does not have the requested card, the requestor's turn is over and she receives one new card from the deck. The next player's turn then begins. In particular implementations, all of the participating players are informed every time a player asks for a card and are told whether the request was successful or not. They can also be shown the requested card. In certain embodiments of the disclosed technology, the amount of information shown for the requested card can vary (e.g., by displaying only the digitized image of the card, or only certain text associated with the card, such as artist name, country, or time period) in order to increase or decrease the level of game difficulty or enhance the educational value by encouraging students to make associations (e.g., students can be encouraged to make an association between the digitized image and the artist name).

Once a player has gathered all 4 cards in an artist's set, she may claim the artist. Cards by a claimed artist are out of the game. That is, other players cannot ask for them. During one turn, a player can claim as many artists as she has completed. Furthermore, in particular implementations, all participating players are informed when an artist is claimed and are shown the four cards of the corresponding set.

If a player does not wish to ask for a card or claim an artist, she may pass, and the turn passes to the next player. When a player passes, she receives a card from the deck (until the deck is depleted). After the deck is depleted, the turn passes from one player to the next in the same way (on a pass or a failed request) except the player losing the turn does not receive the card from the deck.

The game continues until all artists are claimed and no cards are left in any of the players' hands. The player that claims the most sets wins; the scores can be calculated, for example, on the basis of the number of claimed artists with a bonus for the winner, and can be accumulated and stored in the game play data database.

In other embodiments of the disclosed technology, one or more single-player games are provided by the game server 130. For example, one exemplary single-player game (referred to herein as the "first exemplary single player game") is implemented by the game server 130 in the following manner.

A selection of game "cards" is created by the thematic specialist (or, in certain implementations, by any of the system administrator, moderator, player, or thematic specialist). At the start of the game, the player can select one or more criteria from a list. The criterion can identify the basis on which cards are to be selected by the player (e.g., the name of a classical painter if the cards contain images of classical paintings, or the name of a composer if the cards contain phrases of classical music). The player can also choose to have the system select one or more criteria at random from the list. Also, at the start of the game, the player can select a level of difficulty, which can control, for example, how many lives, cards, and/or criteria are included in the game. In general, the available cards will contain c cards (e.g., 4) for each available criteria a (e.g., 15 artists), or cxa cards.

The "cards" are presented to the player in groups of n cards (e.g., 10) at a time. The number of cards can depend, for example, on the number of cards that will fit on the screen. From each group that appears on the screen, the player selects those that meet the criterion (e.g., the player selects the cards that were painted by the selected painter). The selection can be made, for example, by placing them in one of several boxes h on the screen (using a click-and-drag operation), double-clicking the selected card, or using another selection operation.

If the player's choice is correct, the "card" will be placed and remain in one of the boxes b, otherwise the card will return to its original position and the player will lose one of the player's "lives" that he/she was awarded at the start of the game. If the player succeeds in correctly identifying and placing in the boxes all c cards that meet the criterion before losing all available lives, he/she wins the game, otherwise he/she loses the game. The player can renew the cards on the screen as many times as he/she wishes to.

At the end of the game (when all art works have been correctly placed in their boxes or the player has lost all her "lives"), the score can be calculated, for example, on the basis of the level of difficulty of play, the number of lives lost, and the time it took to complete. In certain implementations, to discourage users from re-using the same group of a large number of times to accumulate extra scores, after a number of correct executions of the same game, the system will diminish the score proportionally to the number of repetitions.

A. Exemplary User Interfaces

1. Exemplary Multiplayer Game Interfaces

Figure 2:
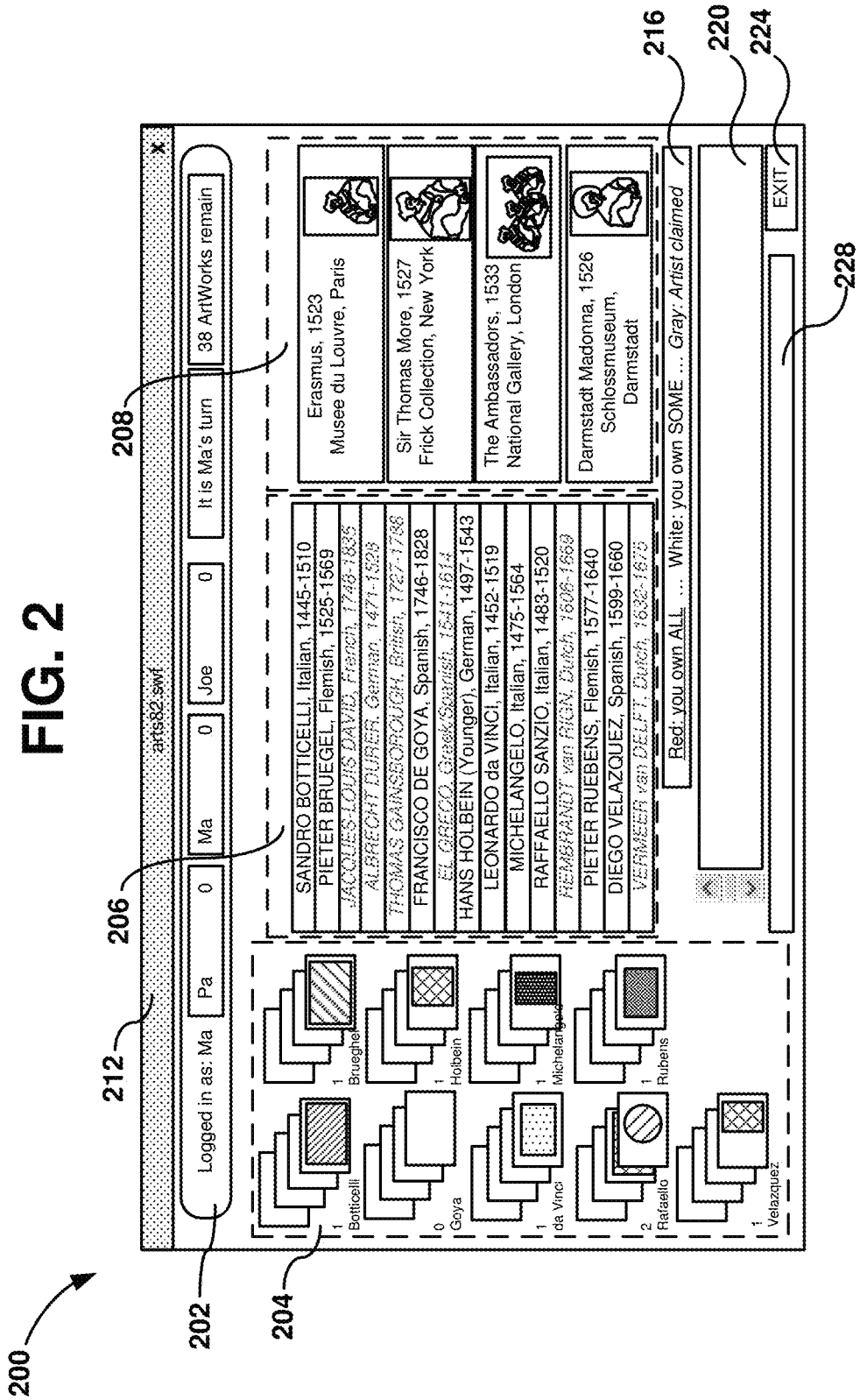
FIG. 2 is a schematic block diagram of an exemplary game interface window as can be used in connection with the exemplary networked single player or multiplayer game system of FIG. 1.

An exemplary graphical user interface 200 of one multiplayer game embodiment (e.g., for implementing the first multiplayer game described above) is depicted in FIG. 2. This embodiment features a version of the card game described above, in which the cards depict oil paintings and the families are grouped by artist. In this embodiment, each player interacts with the client software through a multi-paned game window 212. It is understood that the panes shown in FIG. 2 and in connection with any of the disclosed embodiments need not be contained within one window within the interface; some or all panes may be represented as individual windows or breakaway windows. The panes also do not need to be implemented as static in size or location; the panes can be animated or movable to improve the user experience, similar to the RocketDock for the Microsoft Windows Vista operating system or the application Dock in Mac OS X. The game window 212 can be divided into two or more panes. For example, the illustrated game window 212 includes: Status Pane 202, Hand Pane 204, Chat Response Pane 220, Chat input Pane 228, Play Pane 206, and Selection Pane 208. In the particular embodiment described below, the Play Pane 206 is referred to as "Artist List Pane" and the Selection Pane 208 is referred to as the "Family List Pane" in order to more clearly illustrate the disclosed embodiment, but it should be understood that the functionality is not limited to the particular subject matter described therein. It should be understood that the number and functionality of the panes can vary from implementation to implementation. For example, in other embodiments, only a subset of the exemplary panes is displayed in the game window 212.

The Status Pane 202 displays game information including one or more of the following: the individual player's name, screen name, user ID, avatar, current scores of all the players, an indication of whose turn it currently is, and the number of cards remaining in the deck.

The Hand Pane 204 displays cards currently held by the individual player. In the illustrated example, the cards are arranged into a plurality of matching groups to indicate the number of cards held by the individual player and the number of cards that still need to be acquired to complete a family. The Hand Pane 204 is updated continuously during each turn as cards are acquired from other players, from the deck, or as cards are removed from the individual players' hands because they have been requested by other players. While it is desirable to display all sets held by the player, whether complete or incomplete, the program can automatically adjust the number of sets displayed in the Hand Pane 204 based on the size of the display allotted to the Hand Pane 204 or in response to resizing, scrolling, manipulation of the Hand Pane by the individual user, or changes in the displayed size or arrangement of individual sets within the Hand Pane. Furthermore, the Hand Pane 204 can display cards based on the status of the set (e.g., sets for which the individual player has not acquired any cards may not be displayed in favor of sets for Which the individual player is holding one or more cards).

The Play Pane (or Artist List Pane in the illustrated embodiment) 206 displays different information depending on the respective state of the game and the state of the player's interaction with the Artist List Pane and the Family List Pane 208. The Artist List Pane 206 can display a listing of the families in the game (e.g., a listing of all the artists in the game). As the player flies her mouse indicator over a listing for an individual family, the entry for the family in the Artist List Pane 206 can be highlighted, and the Family List Pane 208 (described below) can display all cards belonging to that individual family. An individual family may be temporarily selected, or affixed, by a player input action, such as a key press or mouse click, while an individual family is highlighted. The representation of each family in the Artist List Pane 206 can be displayed in a manner which indicates the current game state of that family. For example, the status of a particular family may be indicated by changing the color of the text for that family's name in the Artist List Pane 206, changing the highlighting of the border situated near the family name, displaying a dot or other icon near the family which may indicate multiple states by representing the dot or other icon in multiple colors or patterns, or by changing the shading or pattern of the family name or border. By way of example, the game might have five enumerated family states: empty, occupied, ready to be claimed, family claimed by player, family claimed by another player. Each of these states can be indicated to the player by coloring, for example the text or border near the family name black, white, red, gray, or blue, or by a combination of color and icon. By way of example, the "family completed by other player" and "family completed by player" states might be indicated by displaying the name in gray text, and additionally displaying a red or green icon near the family name, depending on whether the family was completed by another player or by the current player. More specifically, in one particular implementation of the game, the text, border, or fill pertaining to an artist is colored black if no cards of that artist are held by the player, colored white if at least one card of that artist is held by the player, colored red if all cards of that artist are held by the player and are ready to be claimed, or colored gray if that artist has been claimed. If an artist has been claimed, then an icon (e.g., a dot, ball, or a square) near the artist name may be used to further indicate the status of the set. For example, a green icon can indicate that the player has claimed the set pertaining to that artist, or a red icon can indicate that another player has claimed the set pertaining to that artist.

The Selection Pane (or Family List Pane in the illustrated embodiment) 208 displays the cards of the family selected in the Artist List Pane 206 and allows the player to view details of individual cards and request individual cards from other players. The Family List Pane 208 interacts with the Artist List Pane 206 to form a coherent game interface. For example, as the user flies the mouse indicator over families listed in the Artist List Pane 206, the Family List Pane 208 can respond by showing more detailed versions of each card in the currently highlighted family. When a family is selected by the player in the Artist List Pane 206, the Family List Pane 208 temporarily affixes the detailed versions of the select family's cards within the Family List Pane 208. The Family List Pane 208 also indicates the status of the cards displayed by highlighting the text, border, or other feature of the card within the Family List Pane. For example, in one embodiment, if the player is holding the card, the text or border can be drawn in white, otherwise, the text or border of the card is drawn in black. Conversely, the Family List Pane 208 can also be used to change the state of the Artist List Pane 206. A player can select one of the cards displayed in the Family List Pane 208 by creating an input such as a key press or mouse click. After the card is selected in the Family List Pane 208, the Artist List Pane 206 can display a large version of the card that was selected in the Family List Pane.

The Chat Response Pane 220 and Chat Input Pane 228 allow players to communicate with each other over the network using messaging technologies (e.g., Internet Relay Chat, ICQ, Yahoo! Messenger, Zephyr, AIM, Skype, or other such technologies). In certain embodiments, Chat Input Pane 228 can be used to enter messages, which are sent to other players, moderators, or system administrators, and Chat Response Pane 220 displays the individual player's messages, as well as the messages received from other players. For example, the user can select the Chat Pane 220 (e.g., by clicking on the pane) and then communicate with one or all of the players or moderators who are connected to the current game instance. The messaging technologies are not limited to text messaging, but may be extended to voice or video messaging in certain embodiments of the disclosed technology.

Figure 4A:
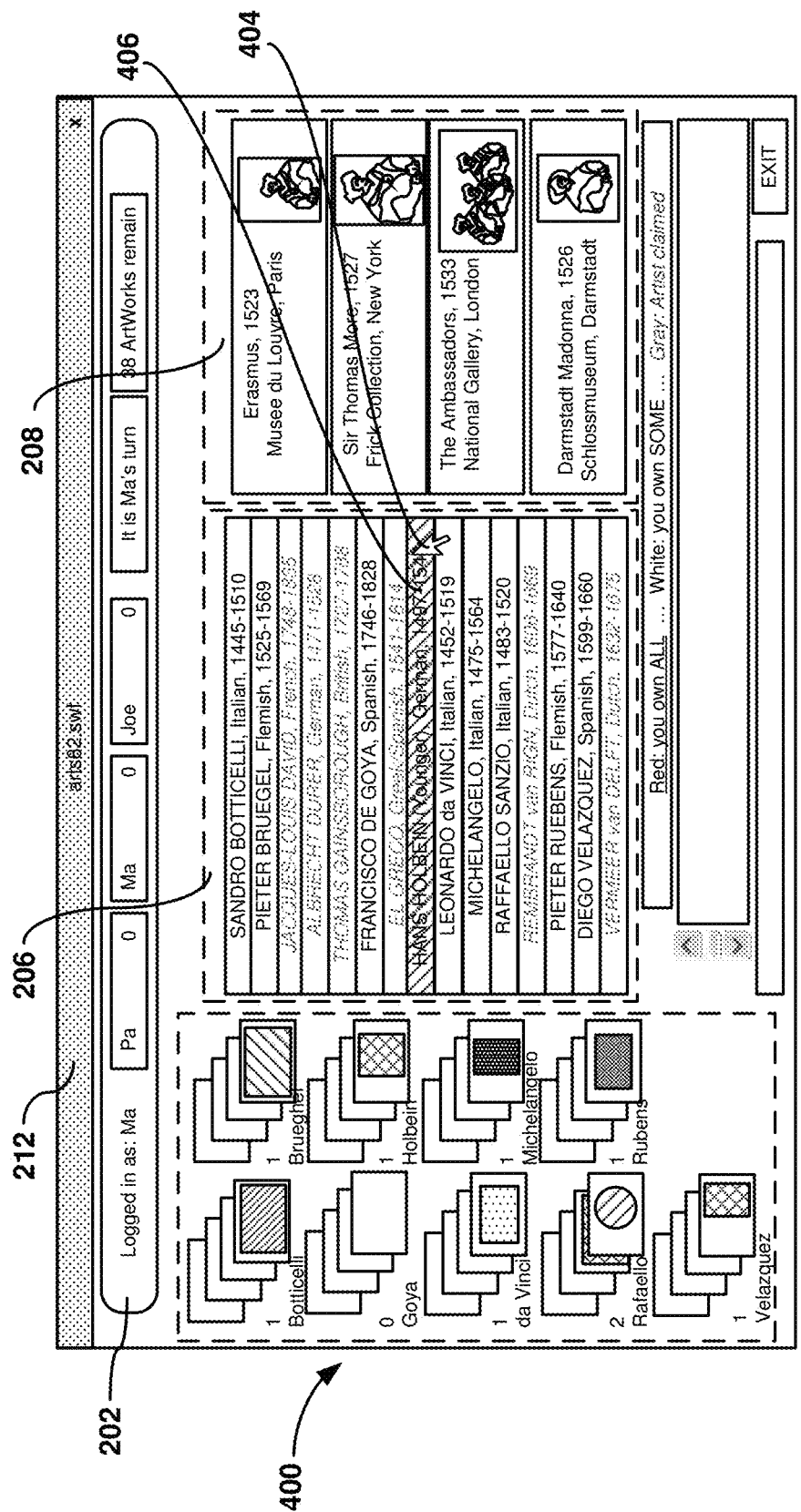
FIGS. 4A-4C are a series of schematic block diagrams that depict requesting of a game card during one possible game that can be played using the exemplary networked game system of FIG. 1.
Figure 4B:
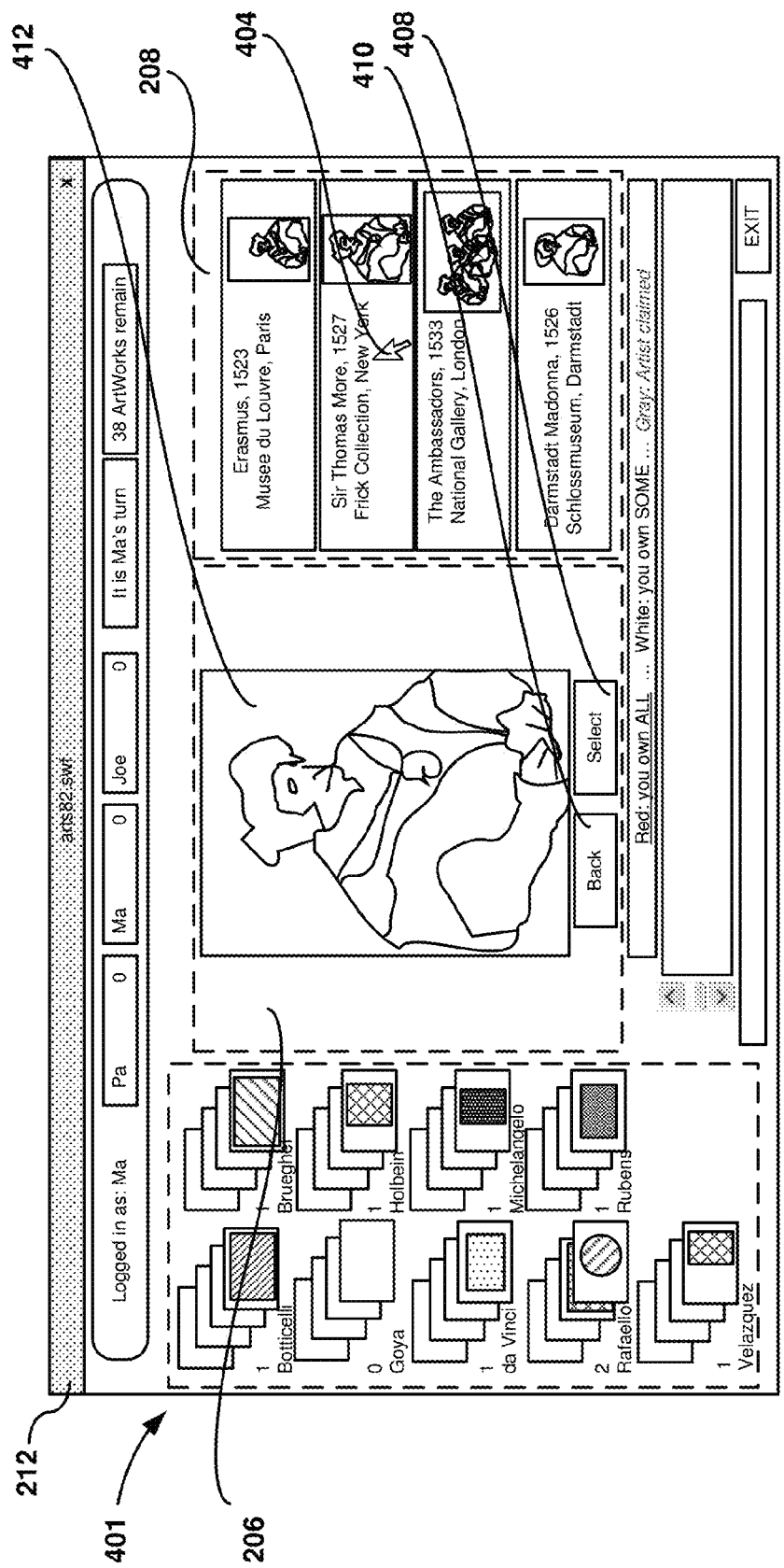
Figure 4C:
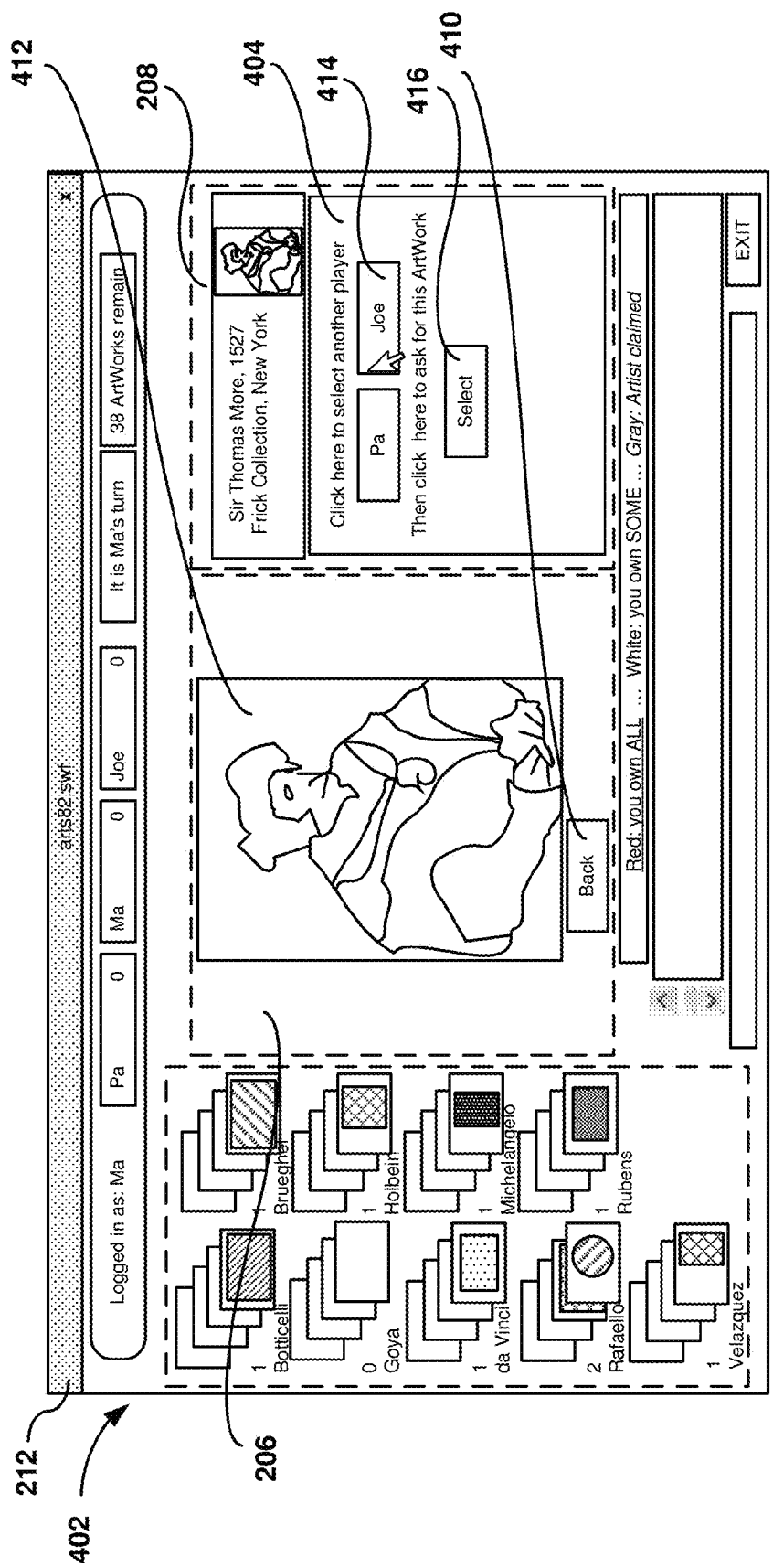

The process of requesting another player's card is depicted in FIGS. 4A-4C. Window 400 in FIG. 4A depicts the state of the multi-pane game window 212 immediately after the player has selected an artist in the Artist List Pane 206. In particular, the mouse pointer arrow 404 was placed over the desired artist name within the Artist List Pane 206 and clicked to select the artist. The four cards associated with the artist are then displayed in the Family List Pane 208.

Window 401 of FIG. 4B depicts the state of the multi-pane game window 212 after the player has selected the desired card from the Family List Pane 208. As seen in window 401, a larger version of the painting, image 412, is displayed in the Artist List Pane 206. Dialog buttons 408, 410 are displayed to solicit the player's input. In the illustrated embodiment, the player can click the back button 410 to go back to window 400 and select another card, or can click the select button 408 to select the card associated with the image 412.

Window 402 of FIG. 4C depicts the state of the multi-pane game window 212 after the player has clicked the select button 408 in window 401. After the user clicks the select button 408, a new dialog window 404 is displayed in the Family List Pane 208. The user then has the option of selecting a player to ask for the selected card, by clicking one of the player name buttons 414, or the player can go back to the previous window 401 by selecting the back button 410. When the player wishes to complete the selection, she clicks select button 416 and the request is finalized and processed by the game server.

The system is able to display each image in multiple sizes. In one embodiment the image is scaled to be displayed in three sizes: one for the Hand Pane 204, one for the Family List Pane 208, and a larger version of the painting, image 412, displayed after user selection in the Artist List Pane 206. The system can also use the same multi-paned game window 212 for player interaction for turn and off-turn play, which facilitates programming and speeds program execution.

2. Exemplary Single Player Game Interfaces

An exemplary graphical user interface for playing a single player game (e.g., the first exemplary single player game) is depicted in FIGS. 5A-5H. This embodiment features a version of the single player game described above, in which the cards depict classical oil paintings and the selectable criterion is the painter of the paintings.

Figure 5A:
FIGS. 5A-5H are a series of screen shots of an exemplary interface window as can be used in connection with an exemplary single player game.

FIG. 5A shows an exemplary screen shot of a player interface window 501 at the start of the game. At the start of the game, the player has 4 lives (represented by the 4 schematic "persons" in the top left region of the window). The user can select an artist from the pull-down menu in the top center region of the screen or choose to have the system select an artist at random from among the list. The four boxes on which the artist's works will be placed are initially empty. The window 501 also shows the first 10 paintings from which the player can select a painting that is believed to meet the selected criterion. It is to be understood that the number of paintings shown and the number of available boxes in which to place the paintings will vary from implementation to implementation.

Figure 5B:

FIG. 5B shows a screen shot of a player interface window 502 and depicts how a particular artist can be selected as the criterion for matching the displayed paintings using a drop-down window. In the example shown by the window 502, the player chooses as the criterion for the game paintings by Peter Brueghel the Elder.

Figure 5C:

FIG. 5C shows a screen shot of a player interface window 503 in which the selected criterion is now displayed at the top of the screen. As there are no paintings by Brueghel in the first set of paintings that appear on the screen, the player can click on the arrow at the top right portion of the screen in order to view the next group of 10 paintings, which may be randomly selected (e.g., by the game server) from the available "cards."

Figure 5D:

FIG. 5D shows a screen shot of a player interface window 504 in which the next group of paintings is displayed. This group does contain a painting by Brueghel ("Peasant Wedding").

Figure 5E:

FIG. 5E shows a screen shot of a player interface window 505 in which the player has selected the correct painting and dragged it (e.g., using a click-and-drag operation) to one of the available boxes. Because the selected painting is one that matches the criterion, the painting stays in the selected box when the player finishes the dragging operation.

Figure 5F:

FIG. 5F shows a screen shot of a player interface window 506 in which the player mistakenly selected and tried to drag to a top box the painting "St Anne with the Virgin and Child" (a painting by Albrecht Durer). As a result of the mistaken selection, the painting does not stay in one of the available boxes and the player loses a life (shown by one of the schematic "persons" in the upper left portion of the screen changing color). The game proceeds in this fashion until either the player loses all of his lives or fills each of the available boxes with a correct painting according to the selected criterion.

Figure 5G:

FIG. 5G shows a screen shot of a player interface window 507 later during the game in which the player made one other mistake (and so lost another life) and correctly found two other paintings by Brueghel. At this point, the game is almost complete.

Figure 5H:

FIG. 5H shows a screen shot of a player interface window 508 after the player selects another correct painting and places it in the last available box. The screen 508 displays that the player won and prompts the player about playing again.

B. Exemplary Came Play Flows

1. Exemplary Multiplayer Game Flows

Figure 3:
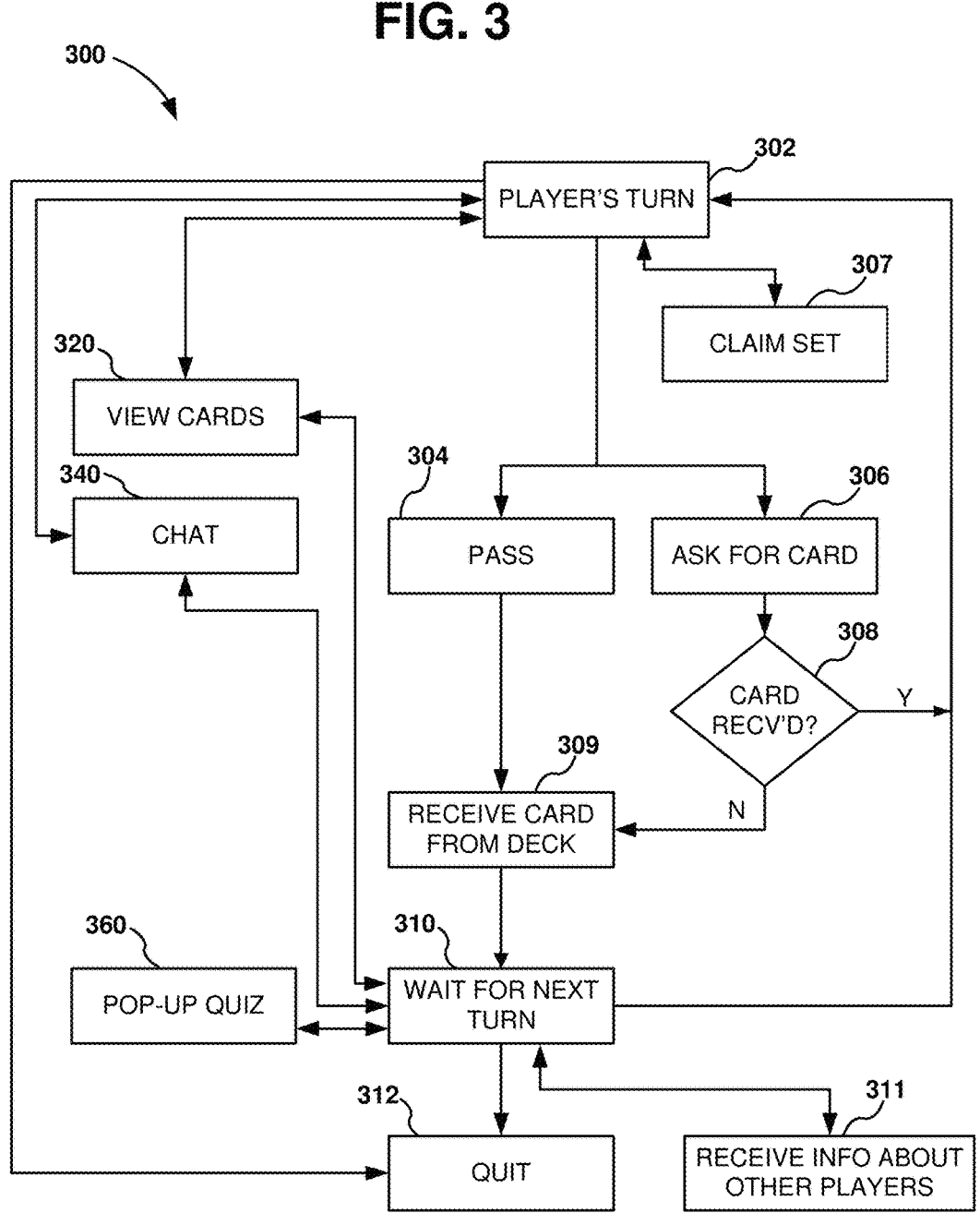
FIG. 3 is a flowchart depicting the flow of game play for one particular multiplayer embodiment of the disclosed technology.

The game play flow 300 of a particular implementation of one multiplayer game embodiment (the first exemplary multiplayer game) is depicted in FIG. 3. After the player has joined the game, she is either the first player to start at 302 ("player's turn") or waits for other players to complete their turns at 310 ("wait for player's next turn"). When it is the player's turn at 302, she has the option of viewing her cards at 320 ("view cards"). While viewing her cards, the player can browse cards in her hand using the Hand Pane 204, select cards from the list of artist names from the Artist List Pane 206, or select from one of the cards depicted in the Family List Pane 208. Alternatively, the player may choose to "chat" at 340 by utilizing Chat Response Pane 220 and Chat Input Pane 228 to interact with other players or moderators. Alternatively, the player may choose to "pass" at 304, at which point that player's turn is over, and the player receives a card from the deck 309 and waits for the next turn at 310 ("wait for player's next turn"). Alternatively, the player can choose to ask for a card at 306 ("ask for card"). At 306, the player indicates which player is being asked for the selected card. The game server 130 determines if the player indicated has the requested card. If the player indicated does have the requested card, the game server transfers the requested card to the player, and the player's game state returns to 302. If the player indicated does not have the requested card, a message can be sent to the player and/or the other players. The player then loses her turn, receives a card from the deck 309, and waits for her next turn at 310. The player may also claim a set (i.e., a family) at 307 ("claim set"). If a set is claimed, the set is locked for the player so that other players can no longer request cards from that set. The player's score can then be adjusted according to the game configuration. While the player is waiting for her next turn at 310, the player will receive information about other players' requests 311, and she can have the option of continuing to browse cards at 320, chatting with other players or moderators at 340, or (in certain implementations) participating in a pop-up quiz 360 (explained in more detail below).

2. Exemplary Single Player Game Flows

Figure 6:
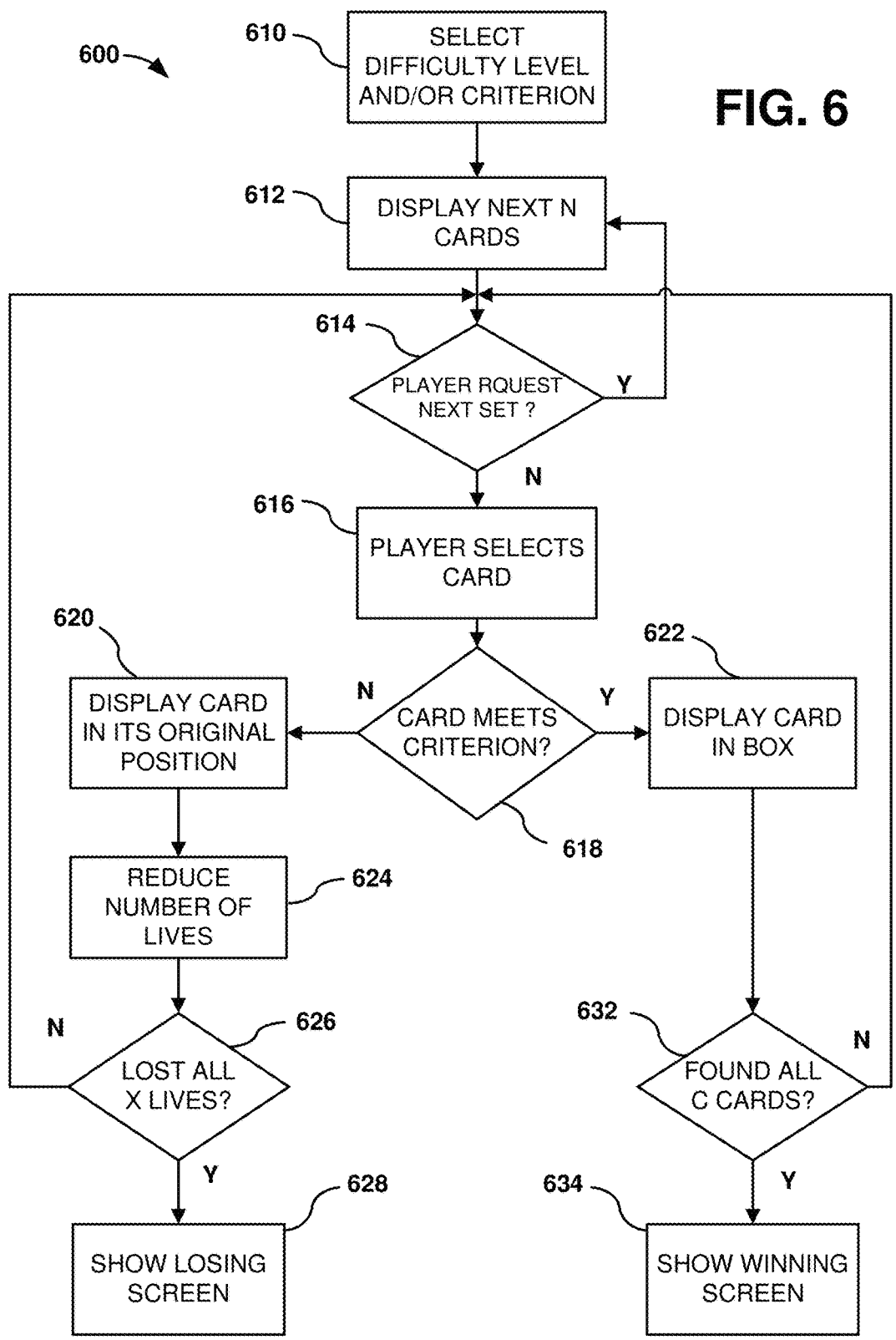
FIG. 6 is a flowchart depicting the flow of game play for the exemplary single player game illustrated in FIGS. 5A-5H.

The game play flow of a particular implementation of a single-player game embodiment is shown in FIG. 6. In particular, FIG. 6 shows a flowchart 600 for the first exemplary single player game depicted in FIGS. 5A-5H, At 610, One or more game play variables are selected by the player. For example, the player can select any one or more of the level of difficulty at which to play (e.g., the number of lives x, the number of artists a and of artworks per artist c, or the type of works) and/or the criterion (e.g., the name of the artist whose works are to be identified) for the game. Any one or more of these variables can also be selected automatically for the player (e.g., selected randomly or in accordance with a historical log indicating which criterion have not yet been selected by the player).

In the illustrated embodiment, at 612, a selection of n cards (e.g., a random selection of cards) is displayed to the user. The number of cards can vary and can be selected from a variable number of available cards. For instance, the number of available cards may be a number equal to the artworks per artist c multiplied by the number of artists a. (e.g., c×a). In the example illustrated in FIGS. 5A-5H, for instance, 10 cards are displayed from a set comprising 60 cards (e.g., a=15 and c=4).

The player evaluates each of the cards on the screen to see if it meets the game criterion (e.g., if the painting was painted by the selected artist, or if the musical phrase was composed by the selected composer). Once he/she has inspected all cards on the screen, he/she may request the system to show on screen the next random group of cards.

At 614, if a request for the next set is made by the player (e.g., by selecting an appropriate button on the screen displayed to the player), then the next set of cards is displayed at 612; otherwise, the player selects one of the displayed cards. If the player believes a card meets the criterion, he/she selects it at 616 and, in one embodiment, tries to drag it to one of the c boxes at the top of the screen. For example, in one embodiment, data concerning the player's selection is transmitted from a client computer to the game server. The identity of the selected card can be determined from this data.

At 618, a determination is made as to whether the selected card meets the game criterion. If the game criterion is met, then the card is displayed in the box selected by the player at 622. At 632, a determination is made as to whether all cards matching the criterion have been selected by the player. If so, then the game ends at 634 with the player being shown a winning screen. The winning screen can show a score received by the player. If all cards matching the criterion have not yet been found, then the game continues.

If the game criterion is not met by the selected card at 618, then the card is returned to its original position or some other indication of the card being an improper selection is provided at 620. Additionally, in the illustrated embodiment, the number of available lives for the player is reduced (e.g., by one) at 624. At 626, a determination is made as to whether the player has any further available lives. If the player has further lives, then the game play continues. If the player has no further lives, then the player loses the game and a losing screen is shown at 628. The losing screen can include, for example, an indication of a score achieved by the player and/or the remaining cards that match the criterion. The score received by the player can depend on the level of difficulty, the time it took to complete and/or the number of lives lost.

C. Audio Incorporation

The disclosed technology can substitute or supplement the visual interface with an audio interface to enhance the educational experience with a musical educational experience.

In one embodiment of the disclosed technology, the game could be played with musicians (e.g., 15 or other number), where the "cards," instead of being visual depictions, are portions of audio passages from a selected number of compositions (e.g., 4 or other number). For example, the musicians can include Beethoven, Mozart, Bach, and Schubert. When one of the musician's "cards" is selected, the computing client 108 can play back the selected portion over one or more audio speakers (e.g., using streaming audio or a complete audio file downloaded from the server computer). The game play can otherwise be similar to the previously described embodiments, which used painters, but the educational value would be derived from the music. It will be understood by one skilled in the art that the selection of musicians and passages is not limited to the classical genre, but can include any musical genre (e.g. classical, jazz, modern, Latino, rock, and so on).

By way of example, the Artist List Pane 206 can display a list of the names of a selection of classical musicians (e.g., 15 or other number). After selecting a musician from the Artist List Pane 206, the Family List Pane 208 can display a list of a number (e.g., 4 or other number) of that musician's major works, from which the player can select one. The computing client 108 is then engaged to playback a brief audio passage with, for example, the main phrase of the selected musical work. For instance, when the player selects Beethoven in the Artist List Pane 206, the Family List Pane 208 displays a list of Beethoven's major works (e.g. the $9^{th}$ (Choral) Symphony, the $3^{rd}$ (Eroica) Symphony, the $5^{th}$ (Emperor) Piano Concerto, and the $14^{th}$ (Moonlight) Piano Sonata). When the player rolls the mouse over or clicks on a Family List Pane 208 item, the computing client 108 plays back a short snippet (e.g., 3-15 seconds) of the main passage of the selected musical work.

Any of the single-player embodiments disclosed herein can also incorporate the use of audio. For example, the first exemplary single-player game described herein can involve a player matching musical passages to an identified composer.

IV. Communities

In certain embodiments of the disclosed technology, the game server 130 hosts a number of groups called "communities." Each community is an organization which includes thematic specialists, players, and moderators who are interested in a particular subject matter. For example, there could be a distinct community for members interested in classical painting, another community for those members interested in impressionist painting, and so on. The communities may be created by the system administrator or by thematic specialists around subject matter that interests them. In one particular implementation, there are four levels of privileges which a person may have within a community: (1) player-level privileges, which typically include the ability to join a community, play games, and participate in other events within the community; (2) thematic-specialist-level privileges, which typically include the ability to create, modify, and configure game configuration and game data; (3) moderator-level privileges, which typically include the ability to monitor games and watch out for possible conflicts between players or possible intrusions by undesirable subjects (such as unknown adults trying to interact with the players) and (4) system-administrator-level privileges, which typically include the ability to create new communities and other administrative tasks on the game server.

Members of a community can share with other members their lists of favorite works or information about upcoming events in their area, as well as participate in virtual activities relating to the community's subject matter (e.g. visits to museums, expositions, or attendance at concerts) or participate in forums or chats with other community members. Members of a community can also post links or other information about museums, concert halls, events, or other items of interest related to the subject matter to which the community is dedicated. Furthermore, thematic specialists can arrange and conduct virtual visits to a museum for the community. For example, the thematic specialist can provide images or links to art works in a museum, along with an accompanying narrative describing the background, significance, or other commentary about the art work.

By participating in or winning games, community members can earn points, which can accumulate in their accounts and eventually be redeemed for prizes. For example, the prizes can include virtual tickets to virtual events (e.g., concerts, opera screenings, or museum or exposition guided virtual visits). Furthermore, in certain embodiments of the disclosed technology, the accumulated points can be redeemed in a virtual auction or marketplace for licensed digital images of an artwork or for original digital art work. The art work can be numbered and/or watermarked appropriately so that each work is unique and legally owned. In other embodiments, the points in the community can be exchanged for points (or other virtual currency) in existing on-line environments for children (e.g., Penguin Club, etc.). Still further, other on-line environments can be modified to include links or other mechanisms for connecting to the web sites of the communities of the disclosed technology. For instance, the communities provided by the disclosed system can be used to provide "museum" or "concert hall" services to other on-line environments.

A. Creation of Games or Game Data; Game Moderation

One feature of a community is the ability for thematic specialists to create or modify game rules and game data to tailor each game to the needs of a specific community. For example, the thematic specialists typically have broad control over the game content. Thematic specialists can modify an existing game to select the subject matter or individual data used within a game. For example, a thematic specialist can modify the card game set forth above to use a set of cards based on sculptors instead of painters, or select the individual paintings or sculptures to be used. The thematic specialist may also import new data, such as video data, graphical data or audio data, by uploading the data from the thematic specialist's client to the game server. The graphical and audio data will typically be in an appropriate format, such as JPEG, GIF, MP3 or TIFF.

Thematic specialists also have the ability to create quizzes, which can be played during the game. The game server can allow the thematic specialist to select questions for the quiz from pre-selected data on the server, or to enter their own questions. In particular embodiments, the thematic specialist has the ability to schedule the frequency of the quizzes and to review the performance of players on quizzes.

Moderators can monitor the discussion in the chat areas. Moderators can also have the ability to screen players from logging into specific games, communities, or even the system itself. In some particular embodiments, the game system not only monitors the performance of players, but also the performance of the moderators. This system monitoring allows for moderators to have their performance tracked and rewarded.

B. Quiz Features

Because many of the games that will be implemented using the disclosed technology are turn-based, there may be substantial time when individual players are not actively engaged with the game. In order to enhance the educational objectives of the disclosed technology, players can participate in quizzes during these idle times. One possible type of quiz that can be provided by the game system is a "pop up quiz." This quiz operates while it is not currently the player's turn. Points can be awarded for a player's performance on the quiz, in addition to points obtained during the regular course of the game.

Another possible type of quiz that can be provided is a scheduled quiz or tournament. Scheduled quizzes can be scheduled at certain times during the day, week, or month. In particular implementations, participating players interact with scheduled quizzes concurrently. Prizes or points can be given to players answering questions correctly. These quizzes can be displayed, viewed, and selected for player interaction either through another pane or window displayed on the client computer 108, or through one of the existing Artist List Pane 206 or Family List Pane 208. By way of example, the thematic specialist or the moderator can create or select a question to be answered by the players currently participating in a game instance. Each active player can view the question on their individual client user interface and choose one or more answers that the player believes is correct from a plurality of answers selected by software running on the server or by the thematic specialist. Alternatively, the player may speak or type the correct answer. The first player to provide the correct answer can be awarded points, which are then added to his or her score. These quizzes can be used to enhance the educational value of the disclosed technology by maintaining player alertness during off-turn periods, as well as reinforcing the educational lesson by prompting recall of material relevant to the game lesson.

C. Games

While the exemplary embodiments illustrated in FIGS. 2-6 relates to paintings, the game software can also be configured to create games involving almost any subject matter, including but not limited to: other visual or physical arts (including architecture, ceramics, glass art, land art, metalworking, mosaics, sculpture, textiles, and woodworking), music (including classical, jazz, and opera), literature, history, geography, languages, science, and mathematics.

The interactive technology disclosed herein can also be adapted for a variety of well-known games, including but not limited to: go fish, happy families, memory, concentration, odd-man-out, details, seven errors, hangman, unscramble, puzzles, and solitaire.

Additional details of particular embodiments of the disclosed technology, including details of additional exemplary games that can be implemented using the disclosed technology, are described in the Appendix below.

In view of the many possible embodiments to which the principles of the disclosed invention may be applied, it should be recognized that the illustrated embodiments are only preferred examples of the invention and should not be taken as limiting the scope of the invention.

APPENDIX

In this appendix, specific embodiments of games and game environments that can be implemented in conjunction with the disclosed methods, apparatus, and systems are disclosed. These specific embodiments are not to be construed as limiting, however, as the disclosed methods, apparatus, and systems can be used in connection with a wide variety of games and game environments.

I. Classical Painters

One possible educational game that can be implemented using the disclosed technology is entitled "classical painters." One exemplary embodiment of the game is described below. The following explanation sometimes uses terms that reference a physical object or entity (e.g., table or dealer). As will apparent from the context of the explanation, such terms can include computer-implemented representations of such objects and entities.

The deck is played with 60 art works, grouped into 15 sets of 4 art works. Each set represents an artist. 2 to 4 players can play the game; the goal is to claim more sets than the other players.

After signing in, players need to get into a game and wait for it to start, which will happen automatically once all players have joined the game. If no game is open, any player can start one, state the desired number of players, and wait for others to join it.

At the start of the game each player is dealt a hand of 11 art works; the rest of the art works stay in the deck, and it is the turn of the player that started the game.

The first player asks for an art work from any of the other players. For example, if his/her hand contains *Primavera* and *The Birth of Venus* by Boticelli, then he/she may want to ask for *Cestello Annunciation* from any other player. To do this, the asking player must first select the art work and then the player from which to ask for it.

If the other player has the requested art work, he or she gives it to the requestor, who then has another shot at requesting from the same or from another player. If the requestor completes a set of four art works by the same artist, he or she can claim the artist and continue playing. A player can only claim artists during his/her turn.

If the other player does not have the requested art work, the requestor's turn is up, he/she receives one art work from the deck (while they last), and it is the turn of the next player.

All players are informed every time a player asks for an art work and whether the request was successful or not; they also are shown the requested art work.

Once a player has gathered all 4 art works in an artist's set, he/she may claim the artist; art works by a claimed artist are out of the game, other players cannot ask for them. During one turn a player can claim as many artists as he/she has completed. AR players are informed when an artist is claimed and are shown the four art works in the set.

If a player does not wish to ask for an art work or claim an artist, he/she may pass, and the turn passes to the next player. When a player passes, he/she receives an art work from the deck (while they last). After the deck is finished, the turn passes from one player to the next in the same way (on a pass or a failed request), except the player losing the turn does not receive the art work from the deck. The game continues until all artists are claimed and no art works are left in any of the players' hands. The player that claims the most sets wins.

A. Getting into a Game

Figure 8A:
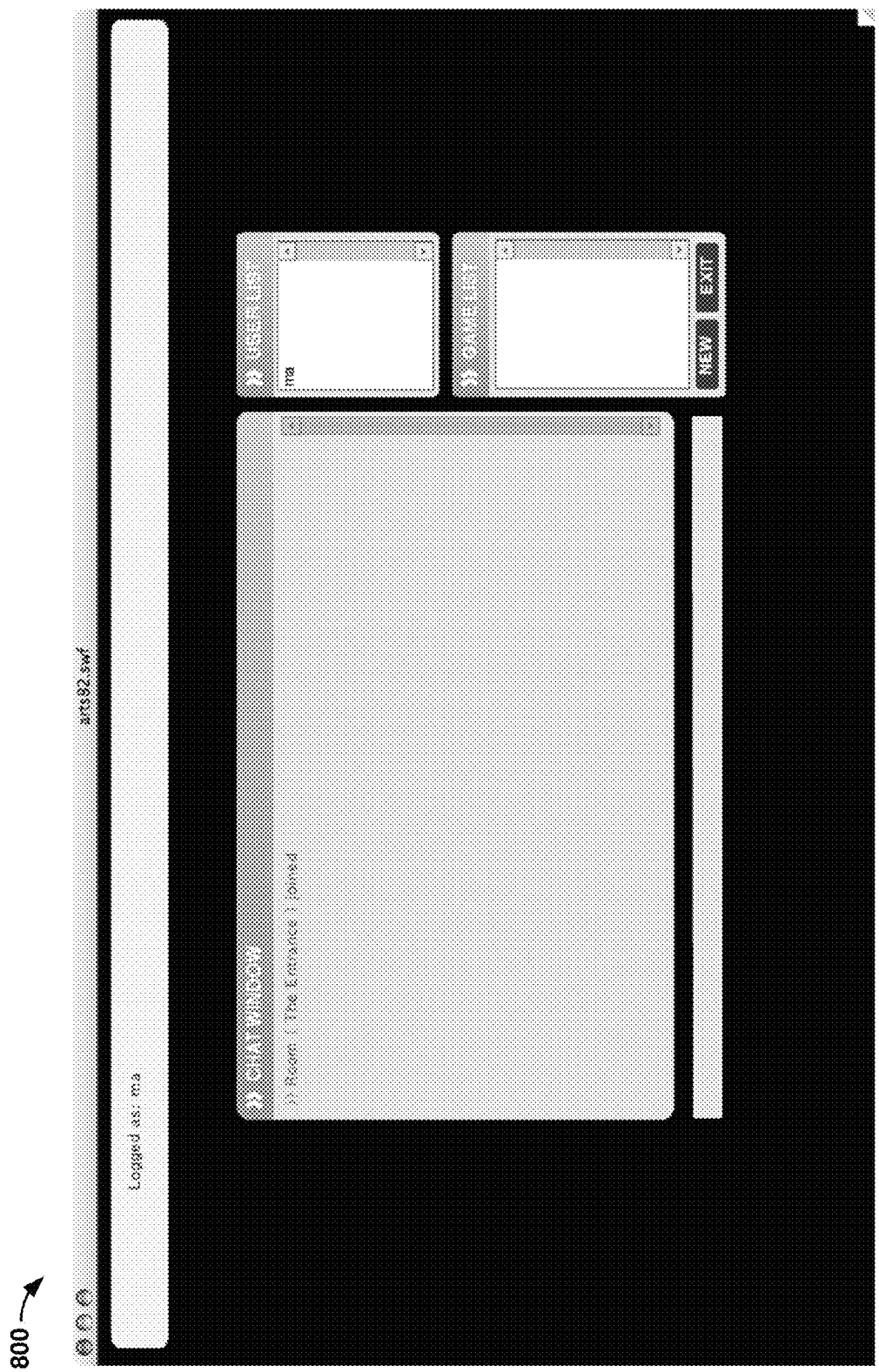
FIGS. 8A-8J are a series of screen shots of an exemplary interface window as can be used in connection with an exemplary multi-player game.

After the game loads, the first screen seen is the login screen. Any name can be used by a player to log into the "entrance room." Once in the entrance room, the player will see a chat window, a user list, and a game list. An exemplary screenshot 800 showing the entrance room screen is shown in FIG. 8A. The player can send chat messages to all players in the entrance room by typing in the bottom part of the chat window, and/or select a user from the user list and send him/her a chat message.

Figure 8B:
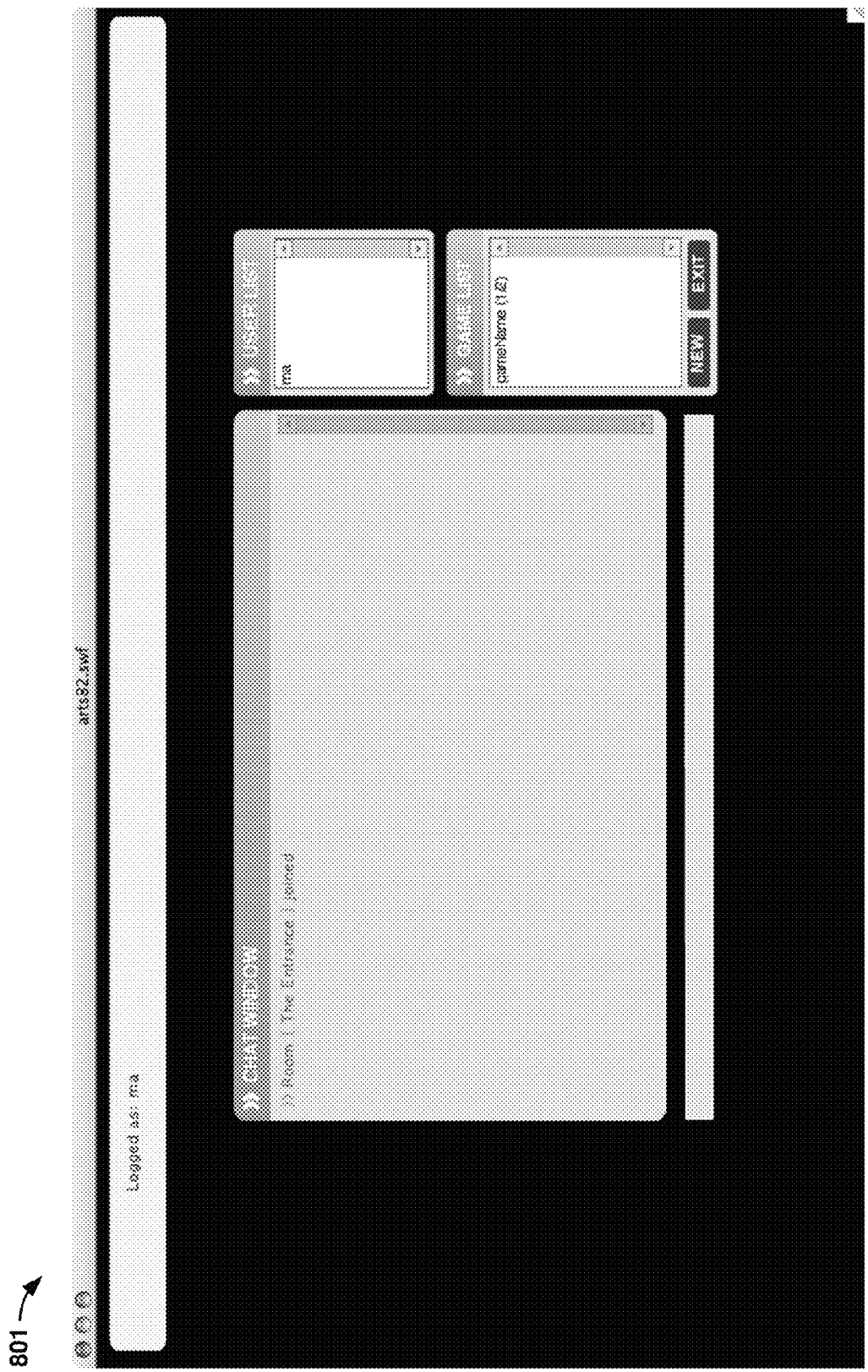

The player can join any game by clicking on it in the game list; the numbers to the right of the game name tell the player how many other players are in already and how many are needed (e.g. 2/4 means it is a 4-player game and there are 2 already in, waiting for 2 others). The player may need a password to join a specific game. An exemplary screenshot 801 showing the game list is shown in FIG. 8B.

Figure 8C:
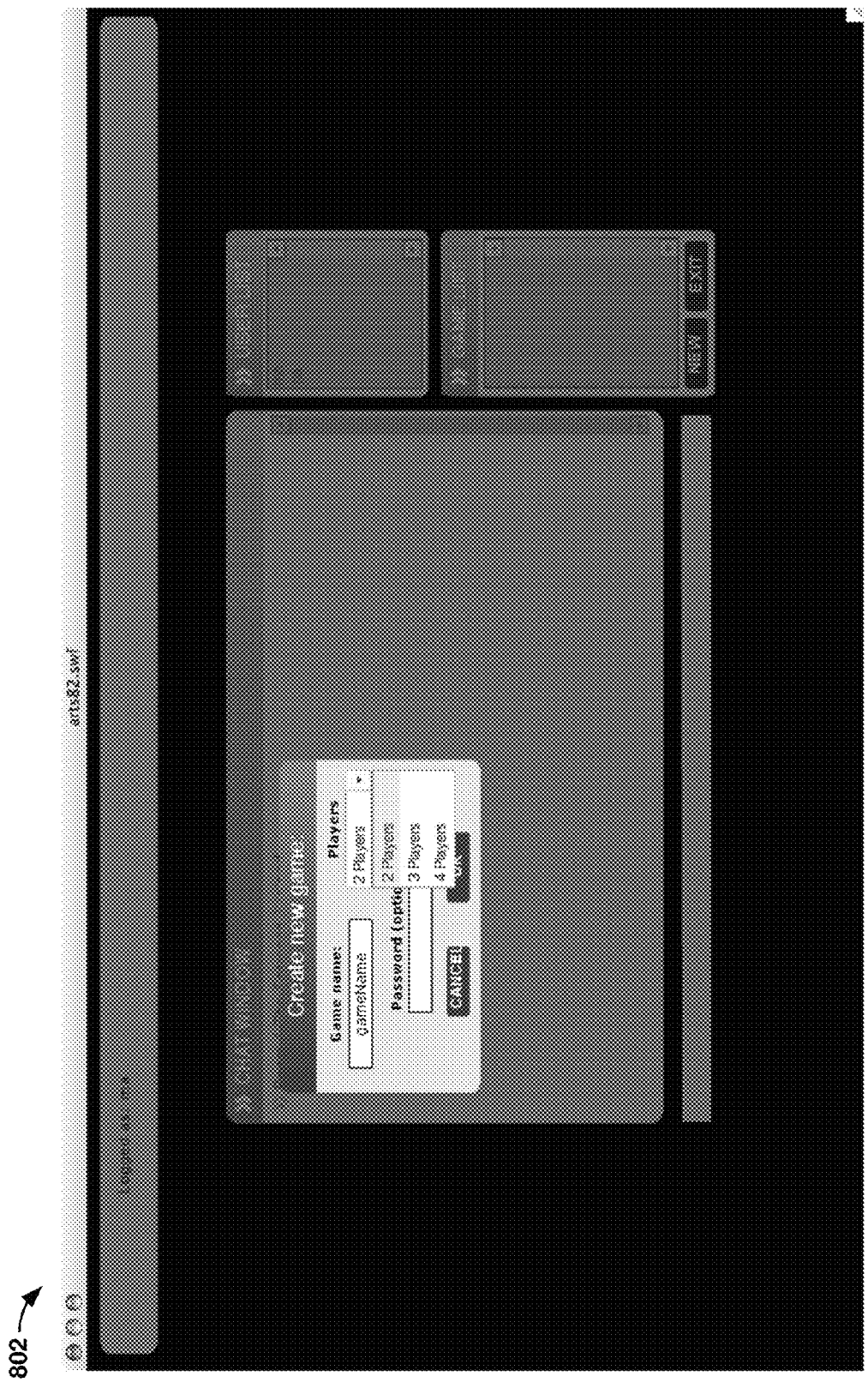

As shown in exemplary screen screenshot 802 in FIG. 8C, the player can also start a new game by clicking on the NEW button and then filling the game name, number of players, and an optional password in the pop-up window. When the player enters a game, the player can initially be placed "on hold" to wait for all other players to join the game. When this happens, the game begins automatically and the player sees the game screen.

The player can leave an unfinished game at any time by clicking EXIT; all the other players will be informed that the player left the game. They can go back to the entrance room and join or start another game.

B. Parts of the GameScreen: Top Info Box, Hand, Play Window, and Chat Area.

1. The Top Info Box.

The top info box shows the player who he/she is (the player's log-in name), the scores of all players in the game, whose turn it is, and the number of art works left in the deck.

2. The Player's Hand.

The player's hand screen shows all the art works the player owns, in up to 10 groups, each group containing the parts of sets the player owns and the name of the artist.

At game start, the hand screen will contain the 11 art works initially dealt to the player. As play progresses, art works from other players are asked for and received from other players, or art works are received from the deck, and the hand screen is updated accordingly.

Figure 8D:
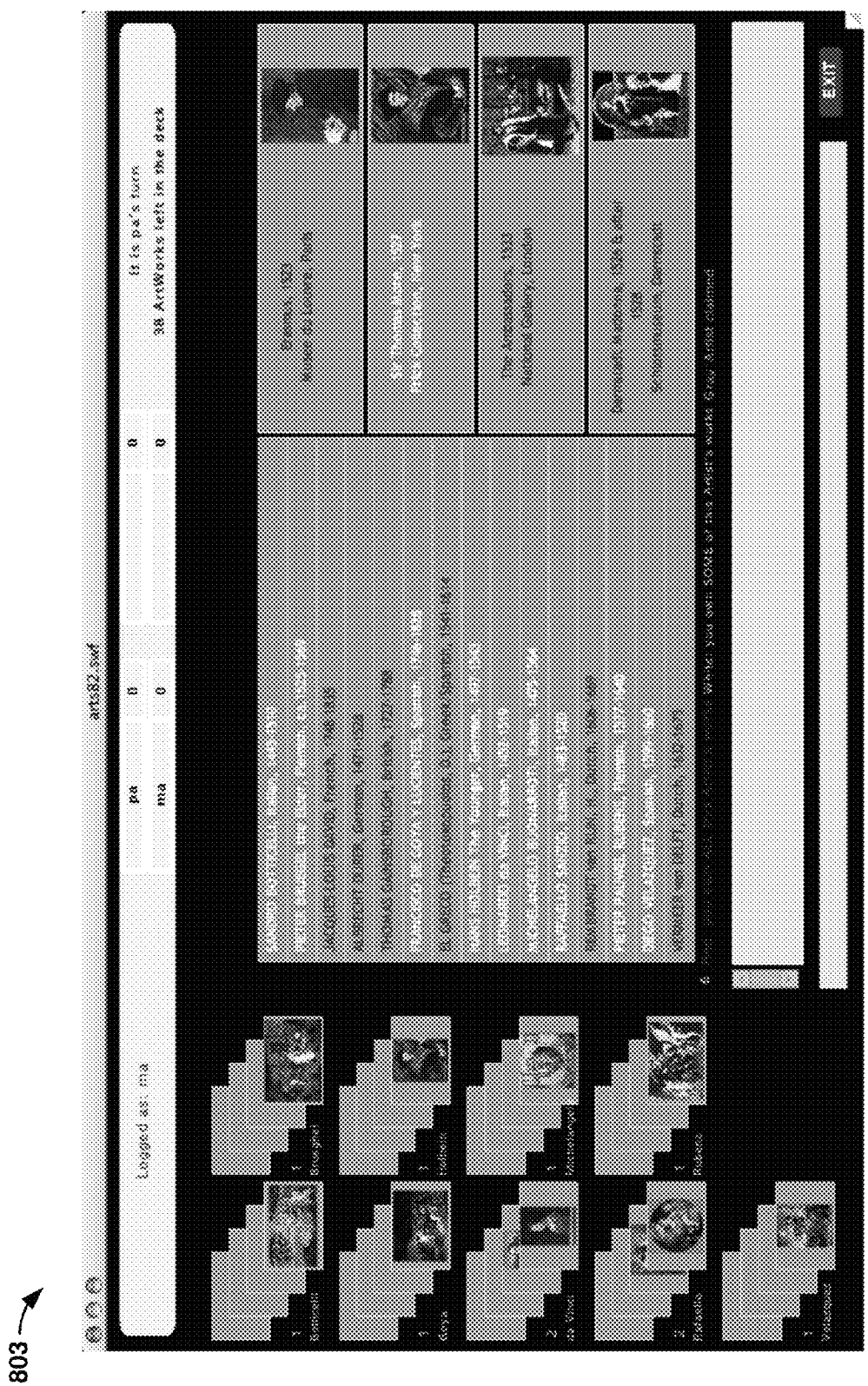

As illustrated in the exemplary screenshot 803 of FIG. 8D, if the player owns art works for more than 10 artists, only the first 10 sets will show in this part of the screen; however, all the artists for which the player owns art works will show in a particular color (e.g., white or, if the set is complete, red) in the left part of the play window, and the art works will show in the same color in the right part of the play window.

3. The Play Window:

If it is the player's turn, the player can use the play window to ask for art works, claim an artist, or pass. If it is not the player's turn, the play window informs the player when other players ask for art works (including whether they receive them or not), when they claim artists, and when they pass.

The play window has two panes. The left pane contains the complete list of 15 artists. As the player rolls the mouse cursor on the list, the artist's four art works show in the right pane. To fix one artist, the player can click on the name in the list. Its box will appear in a specific color (e.g., blue) and the right pane will be fixed at the artist's works.

The artist names can appear in different colors in the left pane of the play window. For example, in one particular embodiment:

If the artist's name appears in black, it means that the player's hand has no art works by the artist;

If the artist's name appears in white, it means that the player's hand has at least one art work by the artist;

If the artist's name appears in red, it means that the player's hand has all 4 art works by the artist and it is ready to be claimed. In this case, the claim button will be enabled if it is the player's turn;

If the Artist's name appears in gray, it means that the artist has been claimed and the art works are out of the game, additionally if the ball to the left of the artist's name is green, it has been claimed by the player; if the ball to the left of the artist's name is red, it has been claimed by another player;

If the player owns an art work, its name will appear in white in the right pane, otherwise it will show in black; and If the player clicks on an art work in the right plane, its image will show at full size in the left pane and, if it is the player's turn, the player may select it in order to ask for it from another player.

It should be understood that the colors can be varied depending on the embodiment and that the exemplary color scheme described above is just one example.

4. The Chat Area

The chart area consists of two chat boxes that work as follows: the player can write in the bottom one and receive in the top one (or vice versa), and can scroll to view older messages.

C. Select Ask

The player can only ask for art works during his/her turn. To ask for an art work, the player can: (A) select the art work; and (B) select another player, who the player thinks has the art work in his/her hand.

In one embodiment, to select an art work, the player must do 2 things: (A) click on the artist's name; and (B) click on the art work's box.

Figure 8E:
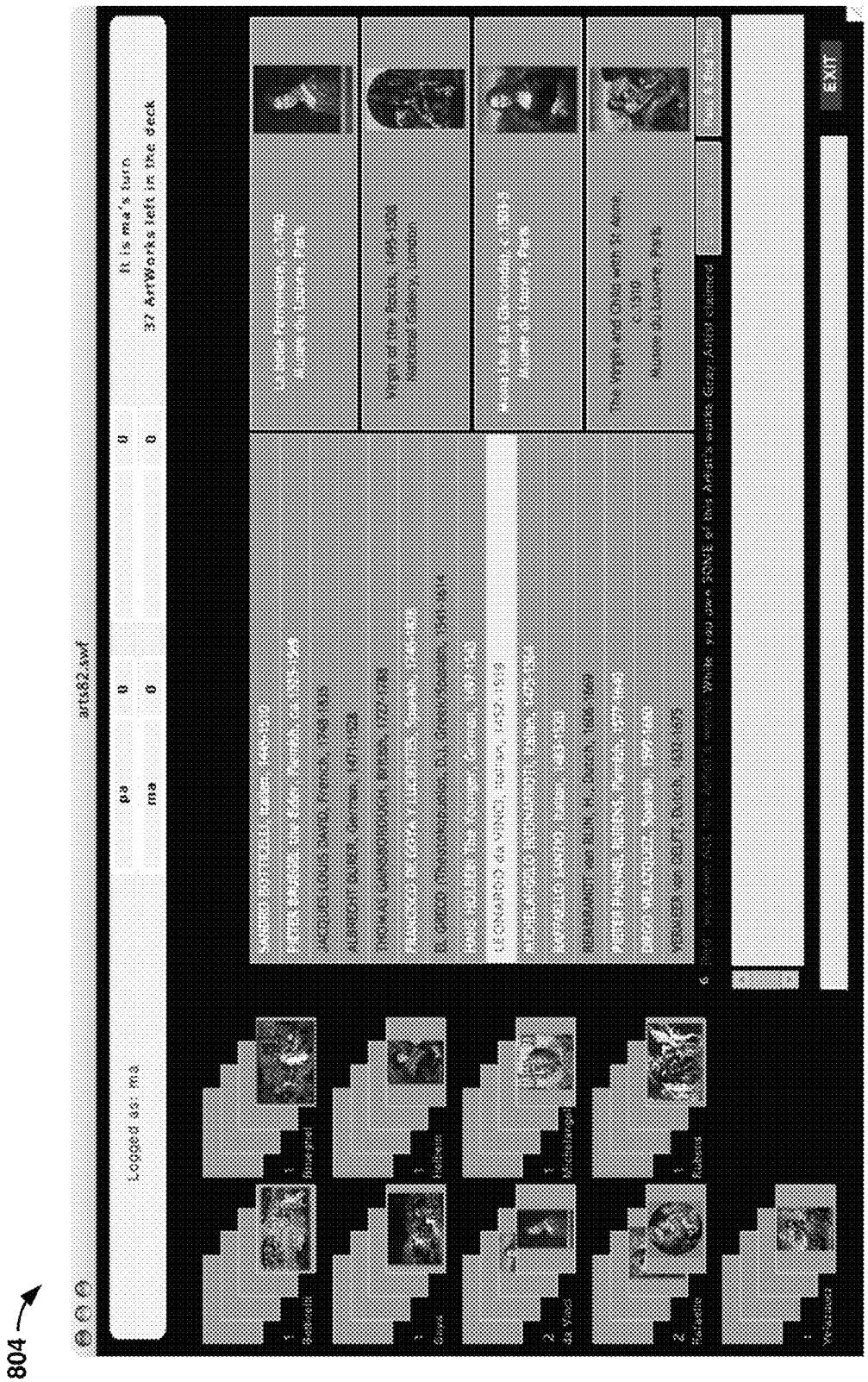

As shown in the exemplary screenshot 804 of FIG. 8E, when the player clicks on the artist's name in the list on the left pane of the play window, the artist's box will change to a particular color (e.g., blue) and this will fix the art works in the right pane of the play window to this artist's set. Some of the art works' names may appear in a specific color (e.g., white), meaning that the art work already belongs to the player (if the player changes his/her mind and wants to select another artist, the player can just click the "back to list" button).

Figure 8F:
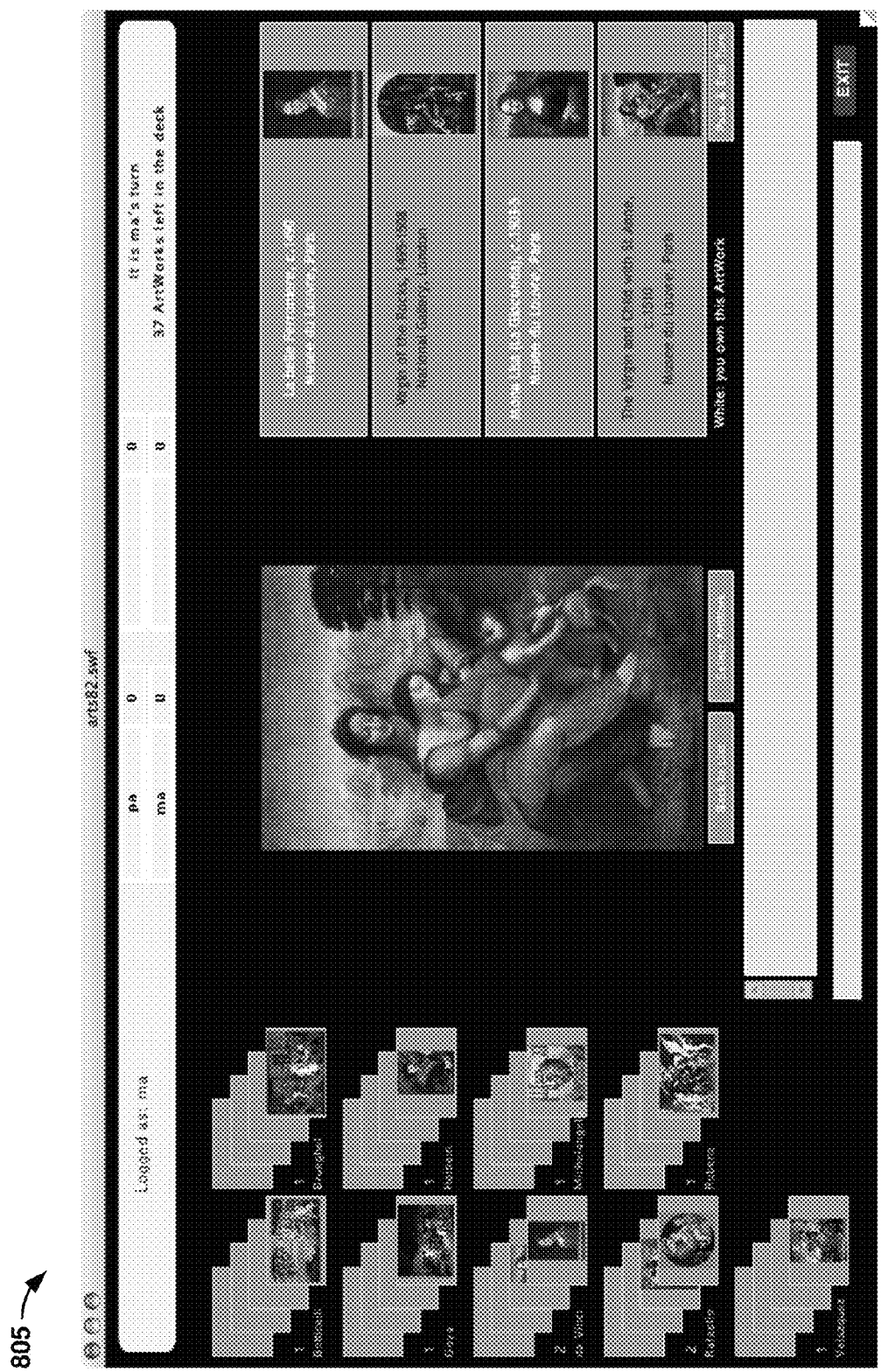

As shown in the exemplary screenshot 805 of FIG. 8F, when the player clicks on the art work's box in the right part of the play window, the art work will appear in a large window replacing the list of artists and the "select art work" button will be activated. If the player changes his/her mind, the player can either click on another art work by the same artist on the right part of the play window, go back to select another artist by clicking the "back to list" button, or click on the pass button.

Figure 8G:
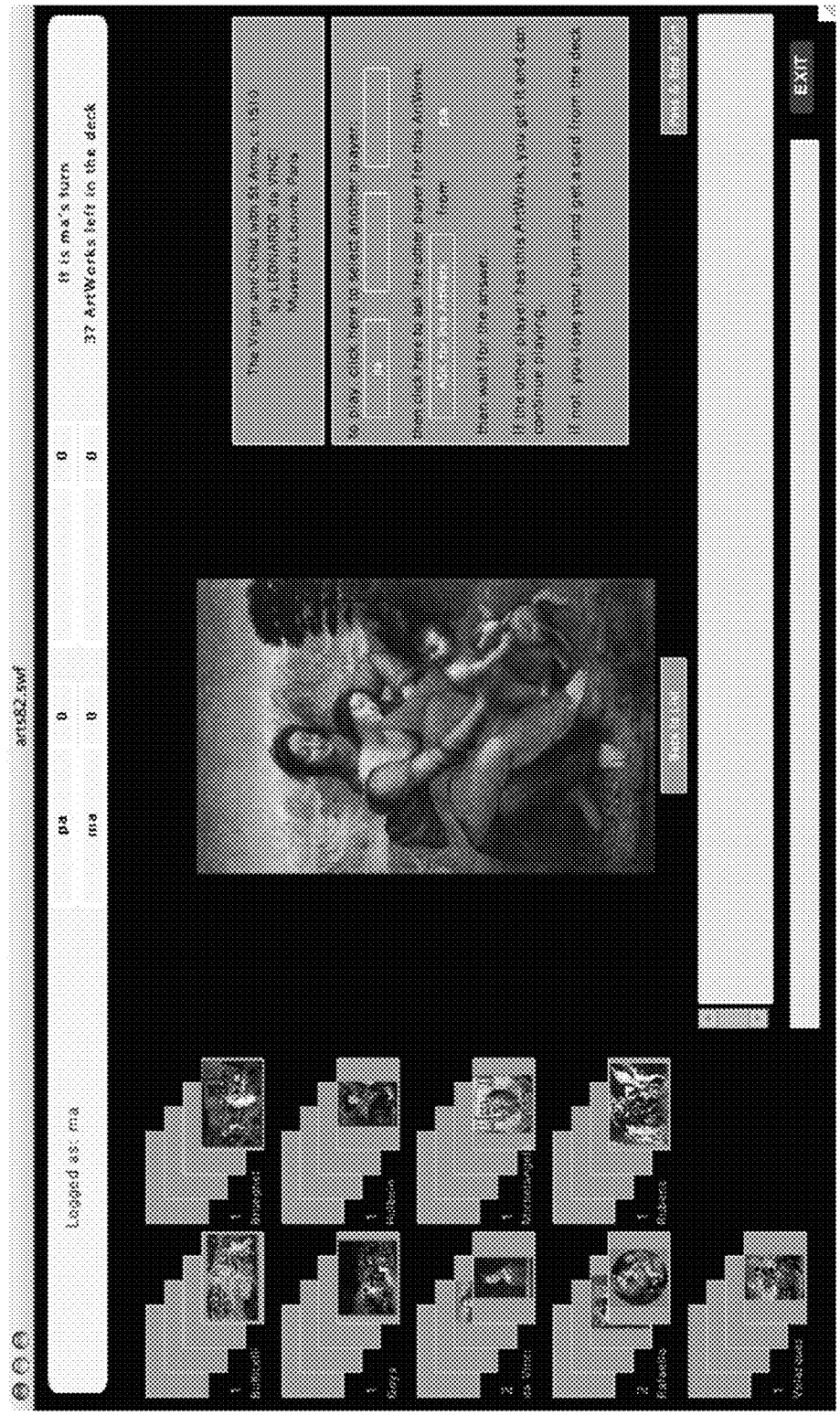

As shown in the exemplary screenshot 806 of FIG. 8G, once the player has selected an art work, the list of the other players will appear in the right part of the play window, along with the "ask for this art work" button.

To select another player, the player can just click on his or her name button. It will appear in the window on the next line, and then click on the "ask for this art work" button.

If the other player has the art work, the player will receive it and can continue playing; otherwise, the player will lose his/her turn and get an art work from the deck. In either case, all the other players are informed of the player's request and of its outcome.

At any time during the select/ask process, the player can change his/her mind and either pass or go back to select another art work (by clicking the "back to list" button).

D. Claim

The player can complete an artist's set by: (1) asking for an artwork from another player and getting it, in this case it will be during the player's turn; or (2) receiving an artwork from the deck at the end of the player's turn; in this case the player must wait until it is again his/her turn to claim the Artist.

Figure 8H:
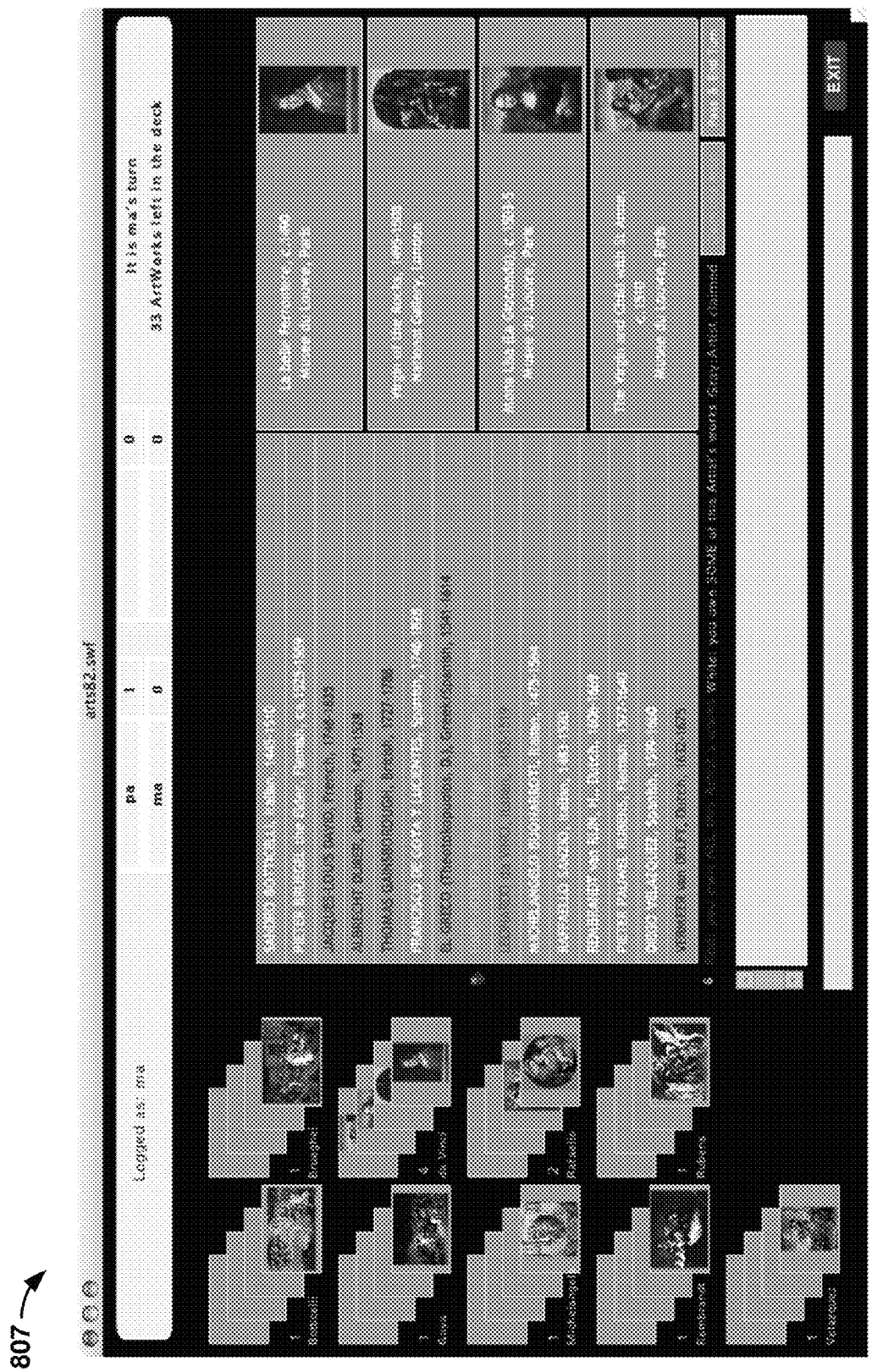

As shown by screenshot 807 in FIG. 8H, once a set is complete, once a Set is complete, the artist's name shows in a different color (e.g., red) in the left pane of the play window. To claim the artist, the player can click on the artist's name. If it is the player's turn, the claim button will be enabled and the player can click on it. As it is still the player's turn, the player can continue playing after claiming an artist.

Figure 8I:
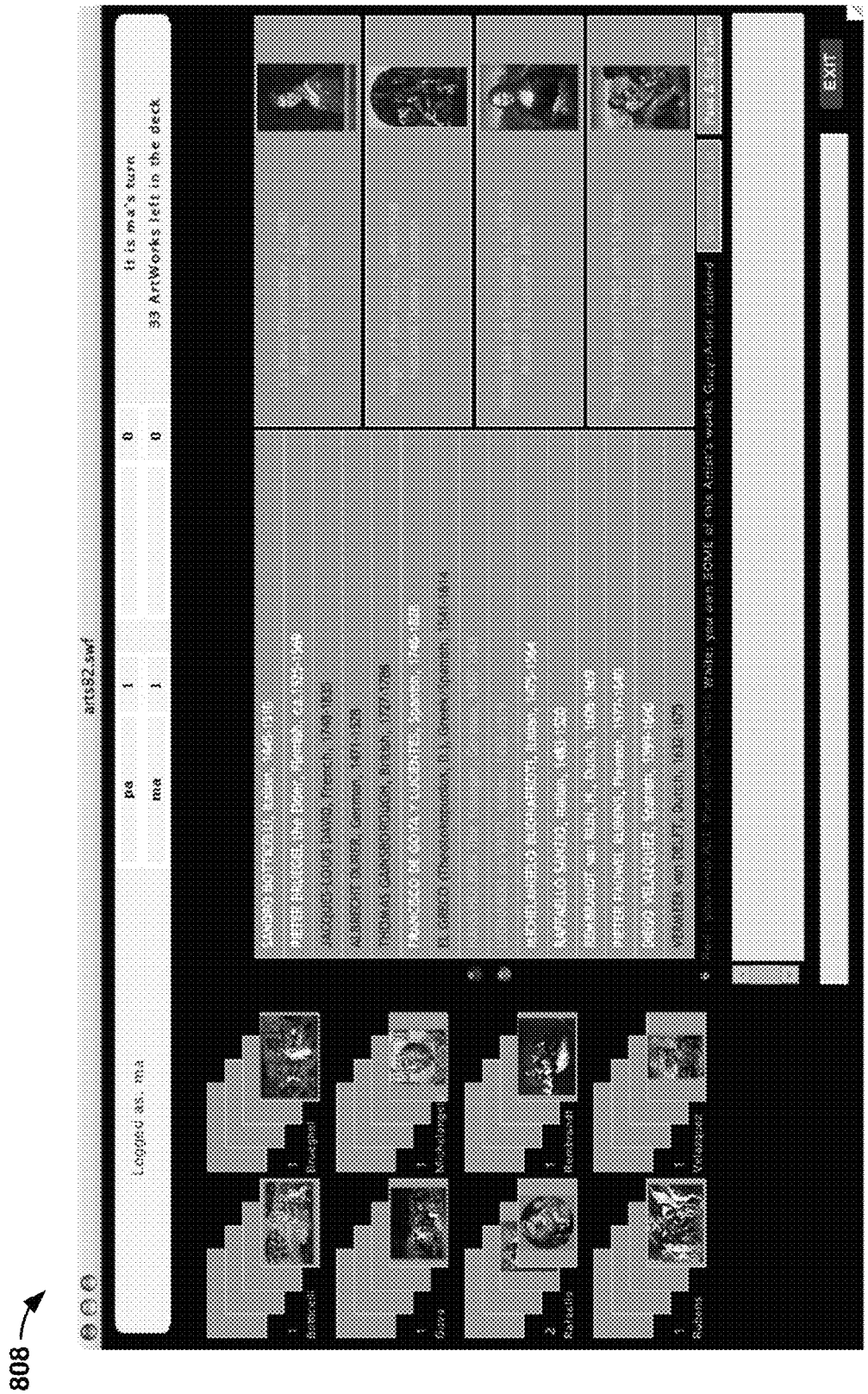
Figure 8J:

As shown by exemplary screenshot 808 in FIG. 8I, after the player claims an artist, several things can happen: the artist's name changes color (e.g., appear in grey) in the left pane of the play window, as do all the art works' names in the right pane of the play window. A ball (e.g., a green ball) appears next to the artist's name (for the other players, this will be a different-colored ball (e.g., a red ball), telling them the artist has been claimed by the player). The player's score is updated in the top info box. The set disappears from the player's hand on the left of the screen. As shown in exemplary screenshot 809 in FIG. 8J, all other players are informed when an artist is claimed and they see the four art works in the set.

E. Deck

The classical painters game of one particular embodiment includes 15 artists, listed below. Each of these painters is represented in the deck by 4 paintings (the art works).

At game start, after each player receives a hand of 11 art works, the remainder of the deck is set aside (the top info box tells the player how many art works are still in the deck); after each change in turn (either by pass or by a failed "ask"), the player who loses the turn gets an art work from the deck (while they last)

The classical painters game can include 15 artists:
"SANDRO BOTTICELLI",
"PIETER BRUEGEL the Elder",
"JACQUES-LOUIS DAVID",
"ALBRECHT DURER",
"THOMAS GAINSBOROUGH",
"FRANCISCO DE GOYA Y LUCIENTES",
"EL GRECO (Theotokopuolos, D.)",
"HANS HOLBEIN The Younger",
"LEONARDO da VINCI",
"MICHELANGELO BUONARROTI",
"RAFFAELLO SANZIO",
"REMBRANDT van RIJN, H.",
"PIETER PAUWEL RUBENS",
"DIEGO VELAZQUEZ",
"VERMEER van DELFT"

F. Art Work

An art work is the unit of play, each artist in the game is represented by 4 art works, for example, Sandro Botticelli is represented by the following art works (paintings):
"Primavera",
"The Birth of Venus",
"Giuliano de' Medici",
"Cestello Annunciation",
which are his set.

The complete list of art works for one embodiment is:

| | |
|---|---|
| Botticelli | Primavera, c. 1482, |
| | The Birth of Venus, c. 1485, |
| | Giuliano de' Medici, 1478, |
| | Cestello Annunciation, 1489-90, |
| Bruegel | Peasant wedding, c. 1568, |
| | The Tower of Babel, 1563, |
| | The Harvesters, 1565, |
| | The Hunters in the Snow (Winter), 1565, |
| David | Portrait of M. Lavoisier and his Wife, 1788, |
| | Napoleon Crossing the St. Bernard, 1800-1, |
| | The Death of Socrates, 1787, |
| | The Death of Marat, 1793, |
| Durer | Self-Portrait at 26, 1498, |
| | Christ Among the Doctors, 1506, |
| | Adam and Eve, 1507, |
| | St Anne with the Virgin and Child, 1519, |
| Gainsborough | River Landscape, 1768-70, |
| | Six Studies of a Cat, 1765-70, |
| | The Painter's Daughters Chasing a Butterfly, c. 1756, |
| | The Morning Walk, c. 1785, |
| Goya | Dn Manuel Osorio Manrique de Zuniga, 1788, |
| | The Nude Maja, 1799-1800, |
| | The Clothed Maja, 1800-3, |
| | The Third of May 1808, 1814, |
| Greco | The Burial of the Count of Orgaz, 1586-8, |
| | A View of Toledo, 1597-99, |
| | The Virgin and Child, 1597-9, |
| | St Jerome as a Scholar, 1600-14, |
| Holbein | Erasmus, 1523, |
| | Sir Thomas More, 1527, |
| | The Ambassadors, 1533, |
| | Darmstadt Madonna, 1526 & after 1528, |
| Da Vinci | La belle Ferroniere, c. 1490, |
| | Virgin of the Rocks, 1495-1508, |
| | Mona Lisa (La Gioconda), c. 1503-5, |
| | The Virgin and Child with St Anne, c. 1510, |
| Michelangelo | The Holy Family with the Infant St. John (Doni Tondo), c. 1506, |
| | The Delphic Sibyl, 1509, |
| | The Ceiling (detail), 1508-12, |
| | Isaiah, 1509, |
| Rafaello | Madonna della Sedia, 1514, |
| | The Prophet Isaiah, 1511-2, |
| | Portrait of Julius II, 1511-2, |
| | St. George Fighting the Dragon, 1505, |
| Rembrandt | Aristotle with a Bust of Homer, 1653, |
| | The Nightwatch, 1642, |
| | Self-Portrait, 1659, |
| | The Anatomy Lecture, 1632, |
| Rubens | Annunciation, 1609-10, |
| | Marie de Medici, Queen of France, 1622, |
| | Perseus and Andromeda, 1620-1, |
| | The Rape of the Sabine Women, c. 1635-7, |
| Velazquez | The Surrender of Breda, c. 1634, |
| | Count-Duke of Olivares on Horseback, 1634, |
| | Juan de Pareja, 1650, |
| | Las Meninas, 1656-7, |
| VerMeer | The Little Street, 1657-8, |
| | Lady at the Virginals with Gentleman, 1662-5, |
| | Girl with a Pearl Earring, c. 1665, |
| | The Art of Painting, 1665-7 |

G. Set

A set (or family) is the group of all art works by one artist. For example, the set of Sandro Botticelli is:
"Primavera",
"The Birth of Venus",
"Giuliano de Medici",
"Cestello Annunciation", H. Turn The message in the top info box tells the player whose turn it is. When the game starts, it is the turn of the player that started the game; when a player loses his/her turn, either because he/she passed or asked for an art work that the other player didn't have, the turn shifts to the next player.

When it is not the player's turn, the player can look at art works and plan his/her next move, the player can also chat with the other players in the game. The player will receive on the right panel of the play window all information on the moves by the other players.

When it is the player's turn, the player can ask for art works from other players, claim an artist, or pass. If the player passes or asks for an art work from the wrong player, the player loses his/her turn and gets a new art work from the deck (while they last).

After the deck is finished, the turn changes but the player does not get an art work; the other players are informed of this. The game continues until all players have an empty hand.

I. Pass

A player may not wish to ask for art works or claim a set, in which case he/she may end the turn by clicking on the pass button. The effect of this is that the turn passes to the next player in the game, all players are informed of the change in turn, and the passing player receives an art work from the deck, while they last. After the deck is finished, the game continues until all sets are claimed and all players have empty hands.

II. Single-Player Classical Painter Game

Another possible educational game that can be implemented using the disclosed technology is a single-player version of the classical painters game. One exemplary embodiment of the game is described below. The following explanation sometimes uses terms that reference a physical object or entity. As will apparent from the context of the explanation, such terms can include computer-implemented representations of such objects and entities.

In one exemplary implementation of the single player classical painters game, the deck comprises four paintings by each of 15 famous painters of the 19th and early 20th Century (see Table below)

| | |
|---|---|
| Mary Cassat | The boating party, c. 1893-4, |
| | The child's bath, c. 1893, |
| | Little girl in a blue armchair, 1878, |
| | Mrs. Duffee seated on a striped sofa, reading, 1876, |
| Paul Cezanne | Montagne Sainte-Victoire, c. 1882, |
| | Still life with a curtain, c. 1895, |
| | Large bathers, 1906, |
| | The card players, 1892-5, |
| Camille Corot | Woman with the pearl, c. 1868-70?, |
| | Orpheus leading Eurydice from the underworld, 1861, |
| | The Cathedral of Mantes, 1865-69, |
| | Ville-d'Avray: Entrance to the Wood, c. 1825, |
| Edgar Degas | The Bellelli family, 1858-67, |
| | The Star, 1876-77, |
| | Horsemen in the rain, 1886, |
| | Morning bath, 1883, |
| Ferdinand Delacroix | The sea from the heights of Dieppe, 1852, |
| | The women of Algiers, 1834, |
| | Frédéric Chopin, 1838, |
| | Liberty leading the People (28th July 1830), 1830, |
| Paul Gaugin | The swineherd, Brittany, 1888, |
| | Tahitian women on the beach, 1891, |
| | Two Tahitian women, 1899, |
| | Night café at Arles, (Mme Ginoux), 1888, |
| Jean-Auguste Ingres | The bather, 1808, |
| | The Grand Odalisque, 1814, |
| | Princess de Broglie, 1851-3, |
| | The dream of Ossian, 1813, |
| Edouard Manet | The balcony, 1868-9, |
| | Young flautist, or The fifer, 1866, |
| | Olympia, 1863, |
| | The luncheon on the grass, 1863, |

-continued

| | |
|---|---|
| Claude Monet | Rouen Cathedral: full sunlight, 1894, |
| | Green reflections(left panel), 1920-6, |
| | Impression, rising sun, 1872-3, |
| | Garden at Sainte-Adresse, 1867, |
| Camille Pissarro | Boulevard Monmartre in Paris, 1897, |
| | The Hermitage at Pontoise, c. 1867, |
| | Young peasant woman drinking her café au lait, 1881, |
| | View from my window, Eragny c. 1886-8, |
| Pierre-Auguste Renoir | Dance at Le Moulin de la Galette, 1876, |
| | Mme. Charpentier and her children, 1878, |
| | A girl with a watering can, 1876, |
| | Two young girls at the piano, 1892, |
| Georges Seurat | Port-en-Bessin, entrance to the harbor, 1888, |
| | The circus (frame painted by artist), 1891, |
| | Sunday afternoon at the island of la Grande Jatte, 1884-6, |
| | Peasants at work, 1882-3, |
| Alfred Sisley | Flood at Port-Manly, 1876, |
| | Snow at Louveciennes, 1874, |
| | The church at Moret, 1894, |
| | Bridge at Villeneuve-la-Garenne, 1872, |
| Alfred Turner | Fishermen at sea, 1796, |
| | The Fighting Temeraire tugged to her last berth, 1839, |
| | The battle of Trafalgar, as seen from the Victory, 1806-8, |
| | The burning of the Houses of Lords and Commons, 1835, |
| Vincent Van Gogh | Starry night over the Rhone, 1888, |
| | The bridge at Arles, 1888, |
| | The olive trees, 1889, |
| | Self-portrait with felt hat, 1887-8 |

The game can be played by one player as described above in Section A.2. In one implementation, game play proceeds as follows. The player can select an artist (e.g., from a drop-down menu) or let the game choose one at random. The selected artist's name will show on the screen (e.g., at the top of the screen). The object of the game is for the player to find all four of the selected Artist's works and drag them to a designated location (e.g., the squares at the top of the screen). If the player does not find all four art works in the first screen, the player can choose to see other works (e.g., by clicking on the top-left arrow in the screen). The player can view the works as many times as he/she wants. When the player drags a work, if it belongs to the selected artist it will stay in the designated location; otherwise, it will go back to its original place and the player will lose a life. If the player loses all four lives, the game ends. The score received by the player will depend on the level of difficulty at which the game is played, on whether the player won or lost the game, on the number of paintings that were correctly placed in the top boxes, and on the number of "lives" that remain at the end of the game.

III. Other Exemplary Games

A. Unscramble

Another possible educational game that can be implemented using the disclosed technology is entitled "unscramble." One exemplary embodiment of the game is described below. The following explanation sometimes uses terms that reference a physical object or entity (e.g., table or dealer). As will apparent from the context of the explanation, such terms can include computer-implemented representations of such objects and entities.

1 to N players can play. The game is played by turns. At the start of the game, each player is dealt an image, which she can see in her "hand" in front of her on the playing "table." All the images that were dealt are split into P JigSaw puzzle-like pieces, shuffled and placed in a pile (which has L layers) at the center of the table. During her turn, a player takes one piece from the pile and joins it to her puzzle. She can continue taking pieces from the pile until she cannot take any more. A piece can only be taken from the pile if it has no other pieces totally or partially on top of it. If a player cannot take a piece from the pile she loses her turn. Drawing a piece that does not belong to her image is not allowed. All players can see the pile as well as all other players' images ("hands") The first player to complete her image wins the game. Configurable items can include one or more of the following: (1) the number of players (N); (2) the images that are dealt at the beginning of the game; (3) the shape of the "mask" used to cut the images into pieces; (4) the number of layers in the pile (L); (5) points won for winning (Y); and/or (6) points won for participating (Z).

Possible variations of the game include one or more of the following: (1) playing against time: after s seconds the top layer of the pile is shifted to the bottom and the turn passes to the next player; (2) the game is played not by turns, but simultaneously: all players can take from the pile at the same time if the piece is on top; (3) images can be repeated so more than one player may be looking for the same fragment of their image; (4) robot players can be used to increase the number of players in a game; (5) a player can play alone or against robot; (6) players are dealt more than one image at the start; and/or (7) players cannot see other players' "hands"

B. Grabbit

Another possible educational game that can be implemented using the disclosed technology is entitled "grabbit." One exemplary embodiment of the game is described below. The following explanation sometimes uses terms that reference a physical object or entity (e.g., table or dealer). As will apparent from the context of the explanation, such terms can include computer-implemented representations of such objects and entities.

There are S "set" cards, numbered 1-S, (e.g., 15), each set contains C cards (e.g., 6). 1 to N players can play (e.g., 3). Each player is dealt SC set cards (e.g., 5). At the start of each turn the dealer places P (e.g., 3) cards face up on the table (e.g., a representation of a table). Each player can take at most I card at each turn from the table. Each turn lasts "sec" seconds (configurable with level of difficulty) When a player completes a set, she claims it and gains P points. The game ends when one of the players has claimed all her sets. The objective is to complete the most sets Possible variations include one or more of the following: (1) two or more players can be dealt the same set cards; (2) players take turns grabbing cards from the table; (3) one or more robot players can be used; or (4) players can see other's hands

C. Details

Another possible educational game that can be implemented using the disclosed technology is entitled "details." One exemplary embodiment of the game is described below. The following explanation sometimes uses terms that reference a physical object or entity (e.g., table or dealer). As will apparent from the context of the explanation, such terms can include computer-implemented representations of such objects and entities. There are C main cards, each containing a complete image. Out of each main card, D detail cards each contain a fragment of the image. Each player is dealt SC main cards. The game is similar to Grabbit, except the Set cards are the complete images and the cards are the Details.

D. 7 Errors

Another possible educational game that can be implemented using the disclosed technology is entitled "7 errors." One exemplary embodiment of the game is described below. The following explanation sometimes uses terms that reference a physical object or entity (e.g., table or dealer). As will apparent from the context of the explanation, such terms can include computer-implemented representations of such objects and entities.

Two images are shown, one showing the original picture, the other with N (e.g., 7) small changes. The game consists of clicking on all of the changes, there is a time limit T (configurable with level of difficulty).

What is claimed is:

1. One or more tangible computer-readable storage devices storing computer-executable instructions for causing a computer to perform a method, the method comprising:
    causing a game interface for an educational game to appear on a computer display device of a first player, the educational game being played with a set of game cards comprising a number of families of two or more cards, each game card comprising a representation of an artistic work, the representation showing a unique classical painting, showing a unique sculpted work, showing a unique architectural work, triggering playback of a unique musical phrase, or showing a unique literary passage, each family having a common criterion, the common criterion being one of a common artist, a common author, a common composer, a common artistic time period, a common artistic theme, a common artistic genre, or a common country of origin, the game interface displaying game cards currently held by the first player as part of the educational game and allowing the first player to input a request for a game card from one or more other players,
    wherein the method further comprises:
        (a) in a first game play instance, simultaneously displaying three first-game-play-instance panes in the game interface on the computer display device (1) a first pane of the multiple first-game-play-instance panes displaying the game cards currently held by the first player, (2) a second pane of the multiple first-game-play-instance panes displaying the list of families from the set of game cards, and (3) a third pane of the multiple first-game-play-instance panes displaying all the game cards of a family selected by the first player from the list of families of the second pane, and
        (b) in a second game play instance triggered by the first player's selection of a respective one of the game cards from the family of game cards displayed in the third pane, simultaneously displaying three second-game-play-instance panes in the game interface on the computer display device, (1) a first pane of the multiple second-game-play-instance panes displaying the game cards currently held by the first player, (2) a second pane of the multiple second-game-play-instance panes displaying an enlarged image of the artistic work in the respective one of the game cards selected by the first player, the second pane of the second game play instance replacing the second pane of the first game play instance in response to the respective one of the game cards being selected by the first player, and (3) a third pane of the multiple second-game-play-instance panes displaying all the game cards of the family of the card selected by the first player.

2. The one or more tangible computer-readable storage devices of claim 1, wherein the method further comprises:

(c) in a third game play instance triggered by the first player confirming selection of the respective one of the game cards, replacing the third pane of the multiple second-game-play instance panes with a third pane of the third game play instance that allows the first player to select one of the other players as a recipient of a request for the selected card.

3. The one or more tangible computer-readable storage devices of claim 2, wherein the method further comprises:
storing the cards remaining in the set of game cards; and
adding one of the remaining cards to the game cards currently held by the first player if the other player selected by the first player does not have the requested game card or if the first player chooses to pass rather than input the request for the game card from the one or more other players.

4. The one or more tangible computer-readable storage devices of claim 1, wherein the game interface further displays one or more of the following: names and scores of the one or more other players, the number of cards left in the set of game cards, or the name of the player whose turn it is.

5. The one or more tangible computer-readable storage devices of claim 1, wherein the method further comprises causing the turn of the first player to end and the first player to receive a card from the set of game cards if the other player selected by the first player does not hold the requested card.

6. The one or more tangible computer-readable storage devices of claim 1, wherein the method further comprises:
allowing the first player to claim a respective family of game cards if the first player holds all game cards in the respective family,
updating a score of the first player in response to the first player claiming the respective family; and
indicating to the one or more other players that the respective family has been claimed, the game cards in the respective family, and the updated score.

7. The one or more tangible computer-readable storage devices of claim 1, wherein, in the first game play instance, the second pane of the game interface displays the families in the list of families using different colors, each of the different colors indicating a different family status.

8. The one or more tangible computer-readable storage devices of claim 1, wherein the method further comprises causing an interface to appear to a thematic specialist that allows the thematic specialist to upload game cards and game data and to select the criterion for the families of the two or more game cards.

9. The one or more tangible computer-readable storage devices of claim 1, wherein the method further comprises storing respective scores for the first player and the one or more other players, and wherein the method further comprises increasing the score for the first player if the first player has all game cards in a respective one of the families and if the first player chooses to claim the respective one of the families.

10. The one or more tangible computer-readable storage devices of claim 1, wherein the game interface further associates each of the game cards of the family with a color, and thereby indicates a current status of the game cards of the family.

11. One or more tangible computer-readable storage devices storing computer-executable instructions for causing a computer to perform a method, the method comprising:
causing a game interface for a single-player educational game to appear on a computer display device of a player, a first portion of the game interface displaying a first set of multiple randomly selected game cards that are available for selection by the player from a set of game cards, the first set consisting of only a portion of the set of game cards, a second portion of the game interface displaying the player's hand of game cards, the first portion being displayed simultaneously with the second portion, the set of game cards being arranged into families of two or more game cards, each game card including a representation of a unique classical painting, a unique sculpted work, a unique architectural work, a unique musical phrase, or a unique literary passage, each family having a common criterion, the common criterion being one of a common artist, a common author, a common composer, a common artistic time period, a common artistic theme, a common artistic genre, or a common country of origin;
allowing the player to select one of the displayed game cards from the first portion of the game interface for inclusion in the hand of game cards displayed to the player in the second portion of the game interface until the hand of game cards is complete or until the player made a predetermined number of erroneous choices, the hand of game cards being complete when the player selects all game cards that satisfy the common criteria for a selected one or more of the families;
displaying, in the game interface, a series of schematic icons that indicate the number of incorrect selections the player can make while attempting to complete the hand; and
displaying, in the first portion of the game interface, a second set of multiple randomly selected game cards in place of the first set of multiple randomly selected game cards if the player does not identify a game card for inclusion in the player's hand from the first set and instead requests an additional set of multiple randomly selected game cards from which to select a game card.

12. The one or more tangible computer-readable storage devices of claim 11, wherein the method further comprises:
calculating a score for the player when the hand is complete; and
displaying the score to the player, wherein the score is based at least in part on one or more of the number of incorrect selections made by the player, the number of times the player has selected the same family, and the time the player spent in completing the hand.

13. The one or more tangible computer-readable storage devices of claim 11, wherein the game interface allows the player to select the common criterion according to which the player's hand is determined to be complete.

14. The one or more tangible computer-readable storage devices of claim 11, wherein the game cards represent musical phrases and trigger audio play back of their respective musical phrases when selected by the player.

* * * * *